United States Patent
Adibi

(10) Patent No.: US 11,328,205 B2
(45) Date of Patent: May 10, 2022

(54) GENERATING FEATURELESS SERVICE PROVIDER MATCHES

(71) Applicant: Talkdesk, Inc., San Francisco, CA (US)

(72) Inventor: Jafar Adibi, Los Angeles, CA (US)

(73) Assignee: TALKDESK, INC., San Francisco, CA (US)

(*) Notice: Subject to any disclaimer, the term of this patent is extended or adjusted under 35 U.S.C. 154(b) by 461 days.

(21) Appl. No.: 16/549,186

(22) Filed: Aug. 23, 2019

(65) Prior Publication Data

US 2021/0056599 A1 Feb. 25, 2021

(51) Int. Cl.
| G06Q 30/00 | (2012.01) |
| G06N 3/04 | (2006.01) |
| G06N 3/08 | (2006.01) |
| G06N 5/02 | (2006.01) |
| G06Q 30/02 | (2012.01) |
| H04M 3/523 | (2006.01) |

(52) U.S. Cl.
CPC .............. *G06N 3/04* (2013.01); *G06N 3/088* (2013.01); *G06N 5/02* (2013.01); *G06Q 30/016* (2013.01); *G06Q 30/0281* (2013.01); *H04M 3/5232* (2013.01)

(58) Field of Classification Search
CPC ............ G06N 3/04; G06N 3/088; G06N 5/02; G06Q 30/0281; H04M 3/5232
USPC ............. 705/346, 7.41; 706/47, 11; 379/242
See application file for complete search history.

(56) References Cited

U.S. PATENT DOCUMENTS

| 5,862,203 | A | 1/1999 | Wulkan et al. |
| 6,100,891 | A | 8/2000 | Thorne |
| 6,128,415 | A | 10/2000 | Hultgren et al. |
| 6,163,607 | A | 12/2000 | Bogart et al. |
| 6,411,687 | B1 | 6/2002 | Bohacek et al. |
| 6,587,831 | B1 | 7/2003 | O'Brien |
| 6,639,982 | B1 | 10/2003 | Stuart et al. |

(Continued)

FOREIGN PATENT DOCUMENTS

| EP | 1 418 519 A1 | 5/2004 |
| WO | 2006/037836 A1 | 4/2006 |

(Continued)

OTHER PUBLICATIONS

Gaietto, Molly., "What is Customer DNA?",—NGDATA Product News, Oct. 27, 2015, 10 pages.

(Continued)

*Primary Examiner* — William J Deane, Jr.

(74) *Attorney, Agent, or Firm* — Rimon P.C.; Marc Kaufman

(57) ABSTRACT

The present disclosure relates to systems, non-transitory computer-readable media, and methods that utilize featureless supervised or unsupervised machine learning to generate service provider match predictions based on raw communication data. In one or more embodiments, the disclosed systems utilize a trained service provider match neural network to generate a service provider match prediction based on raw communication data associated with an incoming audio, text, or video communication. In response to the generated service provider match prediction, the disclosed systems can route the incoming communication to the matched service provider.

20 Claims, 10 Drawing Sheets

(56) References Cited

U.S. PATENT DOCUMENTS

| | | |
|---|---|---|
| 6,754,333 B1 | 6/2004 | Flockhart et al. |
| 6,970,829 B1 | 11/2005 | Leamon |
| 7,023,979 B1 | 4/2006 | Wu et al. |
| 7,076,047 B1 | 7/2006 | Brennan et al. |
| 7,110,525 B1 | 9/2006 | Heller et al. |
| 7,209,475 B1 | 4/2007 | Shaffer et al. |
| 7,274,787 B1 | 9/2007 | Schoeneberger |
| 7,372,952 B1 | 5/2008 | Wu et al. |
| 7,409,336 B2 | 8/2008 | Pak et al. |
| 7,466,334 B1 | 12/2008 | Baba |
| 7,537,154 B2 | 5/2009 | Ramachandran |
| 7,634,422 B1 | 12/2009 | Andre et al. |
| 7,672,845 B2 | 3/2010 | Beranek et al. |
| 7,676,034 B1 | 3/2010 | Wu et al. |
| 7,698,163 B2 | 4/2010 | Reed et al. |
| 7,752,159 B2 | 7/2010 | Nelken et al. |
| 7,774,790 B1 | 8/2010 | Jirman et al. |
| 7,788,286 B2 | 8/2010 | Nourbakhsh et al. |
| 7,853,006 B1 | 12/2010 | Fama et al. |
| 7,864,946 B1 | 1/2011 | Fama et al. |
| 7,869,998 B1 | 1/2011 | Di Fabbrizio et al. |
| 7,949,123 B1 | 5/2011 | Flockhart et al. |
| 7,953,219 B2 | 5/2011 | Freedman et al. |
| 7,966,369 B1 | 6/2011 | Briere et al. |
| 8,135,125 B2 | 3/2012 | Sidhu et al. |
| 8,160,233 B2 | 4/2012 | Keren et al. |
| 8,243,896 B1 | 8/2012 | Rae |
| 8,300,798 B1 | 10/2012 | Wu et al. |
| 8,370,155 B2 | 2/2013 | Byrd et al. |
| 8,391,466 B1 | 3/2013 | Noble, Jr. |
| 8,594,306 B2 | 11/2013 | Laredo et al. |
| 8,635,226 B2 | 1/2014 | Chang et al. |
| 8,671,020 B1 | 3/2014 | Morrison et al. |
| 8,688,557 B2 | 4/2014 | Rose et al. |
| 8,861,691 B1 | 10/2014 | De et al. |
| 8,898,219 B2 | 11/2014 | Ricci |
| 8,898,290 B2 | 11/2014 | Siemsgluess |
| 8,909,693 B2 | 12/2014 | Frissora et al. |
| 8,935,172 B1 | 1/2015 | Noble, Jr. et al. |
| 9,026,431 B1 | 5/2015 | Moreno Mengibar et al. |
| 9,082,094 B1 | 7/2015 | Etter et al. |
| 9,117,450 B2 | 8/2015 | Cook et al. |
| 9,123,009 B1 | 9/2015 | Etter et al. |
| 9,137,366 B2 | 9/2015 | Medina et al. |
| 9,152,737 B1 | 10/2015 | Micali et al. |
| 9,160,853 B1 | 10/2015 | Daddi et al. |
| 9,185,222 B1 | 11/2015 | Govindarajan et al. |
| 9,237,232 B1 | 1/2016 | Williams et al. |
| 9,286,413 B1 | 3/2016 | Coates et al. |
| 9,300,801 B1 | 3/2016 | Warford et al. |
| 9,319,524 B1 | 4/2016 | Webster |
| 9,386,152 B2 | 7/2016 | Riahi et al. |
| 9,426,291 B1 | 8/2016 | Ouimette et al. |
| 9,514,463 B2 | 12/2016 | Grigg et al. |
| 9,609,131 B2 | 3/2017 | Placiakis et al. |
| 9,674,361 B2 | 6/2017 | Ristock et al. |
| 9,679,265 B1 | 6/2017 | Schwartz et al. |
| 9,787,840 B1 | 10/2017 | Neuer, III et al. |
| 9,823,949 B2 | 11/2017 | Ristock et al. |
| 9,883,037 B1 | 1/2018 | Lewis et al. |
| 9,930,181 B1 | 3/2018 | Moran et al. |
| RE46,852 E | 5/2018 | Petrovykh |
| 9,998,596 B1 | 6/2018 | Dunmire et al. |
| 10,009,465 B1 | 6/2018 | Fang et al. |
| 10,115,065 B1 | 10/2018 | Fama et al. |
| 10,154,138 B2 | 12/2018 | Te Booij et al. |
| 10,235,999 B1 | 3/2019 | Naughton et al. |
| 10,242,019 B1 | 3/2019 | Shan et al. |
| 10,331,402 B1 | 6/2019 | Spector et al. |
| 10,380,246 B2 | 8/2019 | Clark et al. |
| 10,440,180 B1 | 10/2019 | Jayapalan et al. |
| 10,445,742 B2 | 10/2019 | Prendki et al. |
| 10,460,728 B2 | 10/2019 | Anbazhagan et al. |
| 10,497,361 B1 | 12/2019 | Rule et al. |
| 10,554,590 B2 | 2/2020 | Cabrera-Gordon et al. |
| 10,554,817 B1 | 2/2020 | Sullivan et al. |
| 10,601,992 B2 | 3/2020 | Dwyer et al. |
| 10,636,425 B2 | 4/2020 | Naughton et al. |
| 10,718,031 B1 | 7/2020 | Wu et al. |
| 10,742,806 B2 | 8/2020 | Kotak |
| 10,783,568 B1 | 9/2020 | Chandra et al. |
| 10,803,865 B2 | 10/2020 | Naughton et al. |
| 10,812,655 B1 | 10/2020 | Adibi et al. |
| 10,827,069 B1 | 11/2020 | Paiva |
| 10,827,071 B1 | 11/2020 | Adibi et al. |
| 10,839,432 B1 | 11/2020 | Konig et al. |
| 10,841,425 B1 | 11/2020 | Langley et al. |
| 10,855,844 B1 | 12/2020 | Smith et al. |
| 10,861,031 B2 | 12/2020 | Sullivan et al. |
| 10,943,589 B2 | 3/2021 | Naughton et al. |
| 2001/0008999 A1 | 7/2001 | Bull |
| 2002/0029272 A1 | 3/2002 | Weller |
| 2002/0034304 A1 | 3/2002 | Yang |
| 2002/0038420 A1 | 3/2002 | Collins et al. |
| 2002/0143599 A1 | 10/2002 | Nourbakhsh et al. |
| 2002/0169664 A1 | 11/2002 | Walker et al. |
| 2002/0174182 A1 | 11/2002 | Wilkinson et al. |
| 2003/0007621 A1 | 1/2003 | Graves et al. |
| 2003/0009520 A1 | 1/2003 | Nourbakhsh et al. |
| 2003/0032409 A1 | 2/2003 | Hutcheson et al. |
| 2003/0061068 A1 | 3/2003 | Curtis |
| 2003/0126136 A1 | 7/2003 | Omoigui |
| 2003/0167167 A1 | 9/2003 | Gong |
| 2004/0044585 A1 | 3/2004 | Franco |
| 2004/0044664 A1 | 3/2004 | Cash et al. |
| 2004/0078257 A1 | 4/2004 | Schweitzer et al. |
| 2004/0098274 A1 | 5/2004 | Dezonno et al. |
| 2004/0103051 A1 | 5/2004 | Reed et al. |
| 2004/0162753 A1 | 8/2004 | Vogel et al. |
| 2005/0033957 A1 | 2/2005 | Enokida |
| 2005/0043986 A1 | 2/2005 | Mcconnell et al. |
| 2005/0063365 A1 | 3/2005 | Mathew et al. |
| 2005/0071178 A1 | 3/2005 | Beckstrom et al. |
| 2005/0226220 A1 | 10/2005 | Kilkki et al. |
| 2005/0271198 A1 | 12/2005 | Chin et al. |
| 2006/0153357 A1 | 7/2006 | Acharya et al. |
| 2006/0166669 A1 | 7/2006 | Claussen |
| 2006/0188086 A1 | 8/2006 | Busey et al. |
| 2006/0215831 A1 | 9/2006 | Knott et al. |
| 2006/0229931 A1 | 10/2006 | Fligler et al. |
| 2006/0277108 A1 | 12/2006 | Altberg et al. |
| 2007/0016565 A1 | 1/2007 | Evans et al. |
| 2007/0036334 A1 | 2/2007 | Culbertson et al. |
| 2007/0061183 A1 | 3/2007 | Seetharaman et al. |
| 2007/0078725 A1 | 4/2007 | Koszewski et al. |
| 2007/0121902 A1 | 5/2007 | Stoica et al. |
| 2007/0136284 A1 | 6/2007 | Cobb et al. |
| 2007/0157021 A1 | 7/2007 | Whitfield |
| 2007/0160188 A1 | 7/2007 | Sharpe et al. |
| 2007/0162296 A1 | 7/2007 | Altberg et al. |
| 2007/0198329 A1 | 8/2007 | Lyerly et al. |
| 2007/0201636 A1 | 8/2007 | Gilbert et al. |
| 2007/0263810 A1 | 11/2007 | Sterns |
| 2007/0265990 A1 | 11/2007 | Sidhu et al. |
| 2007/0287430 A1* | 12/2007 | Hosain ............... H04M 11/002 455/414.1 |
| 2008/0002823 A1 | 1/2008 | Fama et al. |
| 2008/0043976 A1 | 2/2008 | Maximo et al. |
| 2008/0095355 A1 | 4/2008 | Mahalaha et al. |
| 2008/0126957 A1 | 5/2008 | Tysowski et al. |
| 2008/0255944 A1 | 10/2008 | Shah et al. |
| 2009/0018996 A1 | 1/2009 | Hunt et al. |
| 2009/0080411 A1 | 3/2009 | Lyman |
| 2009/0110182 A1 | 4/2009 | Knight, Jr. et al. |
| 2009/0171164 A1 | 7/2009 | Jung et al. |
| 2009/0228264 A1 | 9/2009 | Williams et al. |
| 2009/0285384 A1 | 11/2009 | Pollock et al. |
| 2009/0306981 A1 | 12/2009 | Cromack et al. |
| 2009/0307052 A1 | 12/2009 | Mankani et al. |
| 2010/0106568 A1 | 4/2010 | Grimes |
| 2010/0114646 A1 | 5/2010 | Mcilwain et al. |
| 2010/0189250 A1 | 7/2010 | Williams et al. |
| 2010/0250196 A1 | 9/2010 | Lawler et al. |
| 2010/0266115 A1 | 10/2010 | Fedorov et al. |

(56) References Cited

U.S. PATENT DOCUMENTS

| | | |
|---|---|---|
| 2010/0266116 A1 | 10/2010 | Stolyar et al. |
| 2010/0287131 A1 | 11/2010 | Church |
| 2010/0299268 A1* | 11/2010 | Guha ................ G06Q 30/0205 |
| | | 705/80 |
| 2011/0022461 A1 | 1/2011 | Simeonov |
| 2011/0071870 A1 | 3/2011 | Gong |
| 2011/0116618 A1 | 5/2011 | Zyarko et al. |
| 2011/0125697 A1 | 5/2011 | Erhart et al. |
| 2011/0216897 A1 | 9/2011 | Laredo et al. |
| 2011/0264581 A1 | 10/2011 | Clyne |
| 2011/0267985 A1 | 11/2011 | Wilkinson et al. |
| 2011/0288897 A1 | 11/2011 | Erhart et al. |
| 2012/0051537 A1 | 3/2012 | Chishti et al. |
| 2012/0084217 A1 | 4/2012 | Kohler et al. |
| 2012/0087486 A1 | 4/2012 | Guerrero et al. |
| 2012/0109830 A1 | 5/2012 | Vogel |
| 2012/0257116 A1 | 10/2012 | Hendrickson et al. |
| 2012/0265587 A1 | 10/2012 | Kinkead |
| 2012/0290373 A1 | 11/2012 | Ferzacca et al. |
| 2012/0321073 A1 | 12/2012 | Flockhart et al. |
| 2013/0073361 A1 | 3/2013 | Silver |
| 2013/0085785 A1 | 4/2013 | Rogers et al. |
| 2013/0124361 A1 | 5/2013 | Bryson |
| 2013/0136252 A1 | 5/2013 | Kosiba et al. |
| 2013/0223608 A1 | 8/2013 | Flockhart et al. |
| 2013/0236002 A1 | 9/2013 | Jennings et al. |
| 2013/0304581 A1 | 11/2013 | Soroca et al. |
| 2014/0012603 A1 | 1/2014 | Scanlon et al. |
| 2014/0039944 A1 | 2/2014 | Humbert et al. |
| 2014/0099916 A1 | 4/2014 | Mallikarjunan et al. |
| 2014/0101261 A1 | 4/2014 | Wu et al. |
| 2014/0136346 A1 | 5/2014 | Teso |
| 2014/0140494 A1 | 5/2014 | Zhakov |
| 2014/0143018 A1 | 5/2014 | Nies et al. |
| 2014/0143249 A1 | 5/2014 | Cazzanti et al. |
| 2014/0177819 A1 | 6/2014 | Vymenets et al. |
| 2014/0200988 A1 | 7/2014 | Kassko et al. |
| 2014/0254790 A1 | 9/2014 | Shaffer et al. |
| 2014/0257908 A1 | 9/2014 | Steiner et al. |
| 2014/0270138 A1 | 9/2014 | Uba et al. |
| 2014/0270142 A1 | 9/2014 | Bischoff et al. |
| 2014/0278605 A1 | 9/2014 | Borucki et al. |
| 2014/0278649 A1 | 9/2014 | Guerinik et al. |
| 2014/0279045 A1 | 9/2014 | Shottan et al. |
| 2014/0335480 A1 | 11/2014 | Asenjo et al. |
| 2014/0372171 A1 | 12/2014 | Martin et al. |
| 2014/0379424 A1 | 12/2014 | Shroff |
| 2015/0012278 A1 | 1/2015 | Metcalf |
| 2015/0023484 A1 | 1/2015 | Ni et al. |
| 2015/0030152 A1 | 1/2015 | Waxman et al. |
| 2015/0066632 A1 | 3/2015 | Gonzalez et al. |
| 2015/0100473 A1 | 4/2015 | Manoharan et al. |
| 2015/0127441 A1 | 5/2015 | Feldman |
| 2015/0127677 A1 | 5/2015 | Wang et al. |
| 2015/0172463 A1 | 6/2015 | Quast et al. |
| 2015/0213454 A1 | 7/2015 | Vedula |
| 2015/0262188 A1 | 9/2015 | Franco |
| 2015/0262208 A1 | 9/2015 | Bjontegard et al. |
| 2015/0281445 A1 | 10/2015 | Kumar et al. |
| 2015/0281449 A1 | 10/2015 | Milstein et al. |
| 2015/0295788 A1 | 10/2015 | Witzman et al. |
| 2015/0296081 A1 | 10/2015 | Jeong |
| 2015/0339446 A1 | 11/2015 | Sperling et al. |
| 2015/0339620 A1 | 11/2015 | Esposito et al. |
| 2015/0339769 A1 | 11/2015 | Deoliveira et al. |
| 2015/0347900 A1 | 12/2015 | Bell et al. |
| 2015/0350429 A1 | 12/2015 | Kumar et al. |
| 2016/0026629 A1 | 1/2016 | Clifford et al. |
| 2016/0034995 A1* | 2/2016 | Williams ........... G06Q 30/0617 |
| | | 705/26.43 |
| 2016/0042749 A1 | 2/2016 | Hirose |
| 2016/0055499 A1 | 2/2016 | Hawkins et al. |
| 2016/0085891 A1 | 3/2016 | Ter et al. |
| 2016/0112867 A1 | 4/2016 | Martinez |
| 2016/0124937 A1 | 5/2016 | Elhaddad |
| 2016/0125456 A1 | 5/2016 | Wu et al. |
| 2016/0134624 A1 | 5/2016 | Jacobson et al. |
| 2016/0140627 A1 | 5/2016 | Moreau et al. |
| 2016/0150086 A1 | 5/2016 | Pickford |
| 2016/0155080 A1 | 6/2016 | Gnanasambandam et al. |
| 2016/0173692 A1 | 6/2016 | Wicaksono et al. |
| 2016/0180381 A1 | 6/2016 | Kaiser et al. |
| 2016/0191699 A1 | 6/2016 | Agrawal et al. |
| 2016/0191709 A1 | 6/2016 | Pullamplavil et al. |
| 2016/0191712 A1 | 6/2016 | Bouzid et al. |
| 2016/0300573 A1 | 10/2016 | Carbune et al. |
| 2016/0335576 A1 | 11/2016 | Peng |
| 2016/0378569 A1 | 12/2016 | Ristock et al. |
| 2016/0381222 A1 | 12/2016 | Ristock et al. |
| 2017/0006135 A1 | 1/2017 | Siebel et al. |
| 2017/0006161 A9 | 1/2017 | Riahi et al. |
| 2017/0024762 A1 | 1/2017 | Swaminathan |
| 2017/0032436 A1 | 2/2017 | Disalvo et al. |
| 2017/0068436 A1 | 3/2017 | Auer et al. |
| 2017/0068854 A1 | 3/2017 | Markiewicz et al. |
| 2017/0098197 A1 | 4/2017 | Yu et al. |
| 2017/0104875 A1 | 4/2017 | Im et al. |
| 2017/0111505 A1 | 4/2017 | Mcgann et al. |
| 2017/0148073 A1 | 5/2017 | Nomula et al. |
| 2017/0207916 A1 | 7/2017 | Luce et al. |
| 2017/0220966 A1* | 8/2017 | Wang ..................... G06Q 20/12 |
| 2017/0286774 A1* | 10/2017 | Gaidon ................ G06K 9/6201 |
| 2017/0316386 A1 | 11/2017 | Joshi et al. |
| 2017/0323344 A1 | 11/2017 | Nigul |
| 2017/0337578 A1 | 11/2017 | Chittilappilly et al. |
| 2017/0344988 A1 | 11/2017 | Cusden et al. |
| 2018/0018705 A1 | 1/2018 | Tognetti |
| 2018/0032997 A1 | 2/2018 | Gordon et al. |
| 2018/0053401 A1 | 2/2018 | Martin et al. |
| 2018/0061256 A1 | 3/2018 | Elchik et al. |
| 2018/0077250 A1 | 3/2018 | Prasad et al. |
| 2018/0121766 A1 | 5/2018 | Mccord et al. |
| 2018/0137555 A1 | 5/2018 | Clausse et al. |
| 2018/0165723 A1 | 6/2018 | Wright et al. |
| 2018/0174198 A1 | 6/2018 | Wilkinson et al. |
| 2018/0189273 A1 | 7/2018 | Campos et al. |
| 2018/0190144 A1 | 7/2018 | Corelli et al. |
| 2018/0198917 A1 | 7/2018 | Ristock et al. |
| 2018/0260857 A1 | 9/2018 | Kar et al. |
| 2018/0286000 A1 | 10/2018 | Berry et al. |
| 2018/0293327 A1 | 10/2018 | Miller et al. |
| 2018/0293532 A1 | 10/2018 | Singh et al. |
| 2018/0300641 A1* | 10/2018 | Dong ..................... G06N 3/08 |
| 2018/0349858 A1 | 12/2018 | Walker et al. |
| 2018/0361253 A1 | 12/2018 | Grosso |
| 2018/0365651 A1 | 12/2018 | Sreedhara et al. |
| 2018/0372486 A1 | 12/2018 | Farniok et al. |
| 2019/0013017 A1 | 1/2019 | Kang et al. |
| 2019/0028587 A1 | 1/2019 | Unitt et al. |
| 2019/0042988 A1 | 2/2019 | Brown et al. |
| 2019/0108834 A1 | 4/2019 | Nelson et al. |
| 2019/0130329 A1 | 5/2019 | Fama et al. |
| 2019/0132443 A1 | 5/2019 | Munns et al. |
| 2019/0147045 A1 | 5/2019 | Kim |
| 2019/0172291 A1 | 6/2019 | Naseath |
| 2019/0180095 A1 | 6/2019 | Ferguson et al. |
| 2019/0182383 A1 | 6/2019 | Shaev et al. |
| 2019/0205389 A1 | 7/2019 | Tripathi et al. |
| 2019/0236205 A1 | 8/2019 | Jia et al. |
| 2019/0238680 A1 | 8/2019 | Narayanan et al. |
| 2019/0287517 A1 | 9/2019 | Green et al. |
| 2019/0295027 A1 | 9/2019 | Dunne et al. |
| 2019/0306315 A1 | 10/2019 | Portman et al. |
| 2019/0335038 A1 | 10/2019 | Alonso Y Caloca et al. |
| 2019/0349477 A1 | 11/2019 | Kotak |
| 2019/0377789 A1 | 12/2019 | Jegannathan et al. |
| 2019/0386917 A1* | 12/2019 | Malin ................... H04L 69/329 |
| 2019/0392357 A1* | 12/2019 | Surti ..................... H04W 4/40 |
| 2019/0394333 A1 | 12/2019 | Jiron et al. |
| 2020/0012697 A1 | 1/2020 | Fan et al. |
| 2020/0019893 A1 | 1/2020 | Lu |
| 2020/0050996 A1 | 2/2020 | Generes, Jr. et al. |
| 2020/0118215 A1 | 4/2020 | Rao et al. |
| 2020/0119936 A1 | 4/2020 | Balasaygun et al. |

(56) References Cited

U.S. PATENT DOCUMENTS

| | | |
|---|---|---|
| 2020/0125919 A1 | 4/2020 | Liu et al. |
| 2020/0126126 A1 | 4/2020 | Briancon et al. |
| 2020/0134492 A1 | 4/2020 | Copeland |
| 2020/0134648 A1 | 4/2020 | Qi et al. |
| 2020/0175478 A1 | 6/2020 | Lee et al. |
| 2020/0193335 A1 | 6/2020 | Sekhar et al. |
| 2020/0193983 A1 | 6/2020 | Choi |
| 2020/0211120 A1 | 7/2020 | Wang et al. |
| 2020/0218766 A1 | 7/2020 | Yaseen et al. |
| 2020/0219500 A1 | 7/2020 | Bender et al. |
| 2020/0242540 A1 | 7/2020 | Rosati et al. |
| 2020/0250557 A1 | 8/2020 | Kishimoto et al. |
| 2020/0257996 A1 | 8/2020 | London |
| 2020/0280578 A1 | 9/2020 | Hearty et al. |
| 2020/0280635 A1 | 9/2020 | Barinov et al. |
| 2020/0285936 A1 | 9/2020 | Sen |
| 2020/0336567 A1 | 10/2020 | Dumaine |
| 2020/0351375 A1 | 11/2020 | Lepore et al. |
| 2020/0357026 A1 | 11/2020 | Liu et al. |
| 2020/0365148 A1 | 11/2020 | Ji et al. |
| 2021/0004536 A1 | 1/2021 | Adibi et al. |
| 2021/0005206 A1 | 1/2021 | Adibi et al. |
| 2021/0056481 A1 | 2/2021 | Wicaksono et al. |
| 2021/0081869 A1 | 3/2021 | Zeelig et al. |
| 2021/0081955 A1 | 3/2021 | Zeelig et al. |
| 2021/0082417 A1 | 3/2021 | Zeelig et al. |
| 2021/0082418 A1 | 3/2021 | Zeelig et al. |
| 2021/0084149 A1 | 3/2021 | Zeelig et al. |
| 2021/0089762 A1* | 3/2021 | Rahimi .............. G06K 9/00335 |
| 2021/0091996 A1 | 3/2021 | Mcconnell et al. |
| 2021/0105361 A1 | 4/2021 | Bergher et al. |
| 2021/0125275 A1 | 4/2021 | Adibi |
| 2021/0133763 A1 | 5/2021 | Adibi et al. |
| 2021/0133765 A1 | 5/2021 | Adibi et al. |
| 2021/0134282 A1 | 5/2021 | Adibi et al. |
| 2021/0134283 A1 | 5/2021 | Adibi et al. |
| 2021/0134284 A1 | 5/2021 | Adibi et al. |
| 2021/0136204 A1 | 5/2021 | Adibi et al. |
| 2021/0136205 A1 | 5/2021 | Adibi et al. |
| 2021/0136206 A1 | 5/2021 | Adibi et al. |

FOREIGN PATENT DOCUMENTS

| | | |
|---|---|---|
| WO | 2012/024316 A2 | 2/2012 |
| WO | 2015/099587 A1 | 7/2015 |

OTHER PUBLICATIONS

Fan et al., "Demystifying Big Data Analytics for Business Intelligence Through the Lens of Marketing Mix", Big Data Research, vol. 2, Issue 1, Mar. 2015, 16 pages.

An et al,, Towards Automatic Persona Generation Using Social Media Aug. 2016 2016 IEEE 4th International Conference on Future Internet of Things and Cloud Workshops (FiCloudW), 2 pages.

Bean-Mellinger, Barbara., "What Is the Difference Between Marketing and Advertising?", available on Feb. 12, 2019, retrieved from https://smallbusiness.chron .com/difference-between-marketing-advertising-2504 7 .html, Feb. 12, 2019, 6 pages.

Twin, Alexandra., "Marketing", URL: https://www.investopedia.com/lerms/rn/marketing.asp, Mar. 29, 2019, 5 pages.

Dictionary.com, "Marketing", URL: https://www.dictionary.com/browse/marketing, Apr. 6, 2019, 7 pages.

Ponn et al., "Correlational Analysis between Weather and 311 Service Request Volume", eil.mie.utoronto.ca., 2017, 16 pages.

Zhang et al., "A Bayesian approach for modeling and analysis of call center arrivals", 2013 Winter Simulations Conference (WSC), ieeexplore.ieee.org, pp. 713-723.

Mehrotra et al., "Call Center Simulation Modeling: Methods, Challenges, and Opportunities", Proceedings of the 2003 Winter Simulation Conference, vol. 1, 2003, pp. 135-143.

Mandelbaum et al., "Staffing Many-Server Queues with Impatient Customers: Constraint Satisfaction in Call Center", Operations Research, Sep.-Oct. 2009, vol. 57, No. 5 (Sep.-Oct. 2009), pp. 1189-1205.

Fukunaga et al., "Staff Scheduling for Inbound Call Centers and Customer Contact Centers", AI Magazine, Winter, vol. 23, No. 4, 2002, pp. 30-40.

Feldman et al., "Staffing of Time-Varying Queues to Achieve Time-Stable Performance", Management Science, Feb. 2008, vol. 54, No. 2, Call Center Management, pp. 324-338.

Business Wire, "Rockwell SSD announces Call Center Simulator", Feb. 4, 1997, 4 pages.

Nathan, Stearns., "Using skills-based routing to the advantage of your contact center", Customer Inter@ction Solutions, Technology Marketing Corporation, May 2001, vol. 19 No. 11, pp. 54-56.

* cited by examiner

GENERATING FEATURELESS SERVICE PROVIDER MATCHES

BACKGROUND

Recent years have seen significant improvement in hardware and software platforms for communications routing. Indeed, conventional systems identify attributes or profiles associated with an incoming communication and utilize those attributes or profiles to determine how the communication should be routed. For example, in response to receiving an incoming text message, conventional systems can analyze the text message to identify a geographical origin of the text message, and can then route the text message to a service provider (e.g., a customer service agent) who is located within the same geographical area.

Although conventional systems can route communications, this attribute-based approach gives rise to a number of technological problems in accuracy, flexibility, and efficiency. For example, the attribute-based routing methodology utilized by conventional systems relies on a host of arbitrary assumptions and often leads to inaccurate service provider matches. In such circumstances, conventional systems fail to accurately route a communication to the most appropriate service provider simply because attributes of the communication happened to correspond with a different service provider. This approach can lead to routing a communication to a wrong service provider, leading to multiple routing attempts, which results in an inefficient use of communication resources.

Moreover, conventional systems are rigid and inflexible. Indeed, as just mentioned, conventional systems are rigidly tied to predefined connections between attributes and profiles associated with an incoming communication and attributes and profiles associated with a particular service provider. Because of this inflexibility, conventional systems often fail to route communications in such a way that will maximize target metrics that are customized to a particular organization or that will increase the accuracy and efficiency of routing a communication to the most appropriate service provider available.

In addition to shortcomings with regard to accuracy and flexibility, conventional systems are also inefficient. As an initial matter, conventional systems expend significant resources in analyzing commonalities in attributes and profiles between incoming communications and service providers to route the incoming communications. This leads to inefficient utilization of computational resources by routing the incoming communications in a way that is not truly optimized to the specific goals and metrics of an organization.

Thus, there are several technical problems with regard to conventional communication routing systems.

SUMMARY

One or more embodiments provide benefits and/or solve one or more of the foregoing or other problems in the art with systems, methods, and non-transitory computer readable storage media that utilize featureless supervised or unsupervised machine learning to accurately, flexibly, and efficiently route incoming communications to matched service providers so as to optimize one or more metrics customized to a particular organization. In particular, an unsupervised matching system, as described herein, generates matches between an incoming communication and service providers without relying on any attribute or profile extracted from or associated with either the communication or the service provider.

For example, in one or more embodiments, the disclosed systems train a service provider match neural network with training inputs that include raw communication training data that is untethered from any additional information associated with the communications themselves. By applying the trained service provider match neural network to raw communication data associated with a new incoming communication, the unsupervised matching system can generate a service provider match prediction that will accurately, flexibly, and efficiently utilize computing resources in optimizing one or more target metrics associated with the incoming communication.

Additional features and advantages of one or more embodiments of the present disclosure will be set forth in the description that follows, and in part will be obvious from the description, or may be learned by practice of such example embodiments.

BRIEF DESCRIPTION OF THE DRAWINGS

The detailed description is described with reference to the accompanying drawings in which.

DETAILED DESCRIPTION

Figure 1:
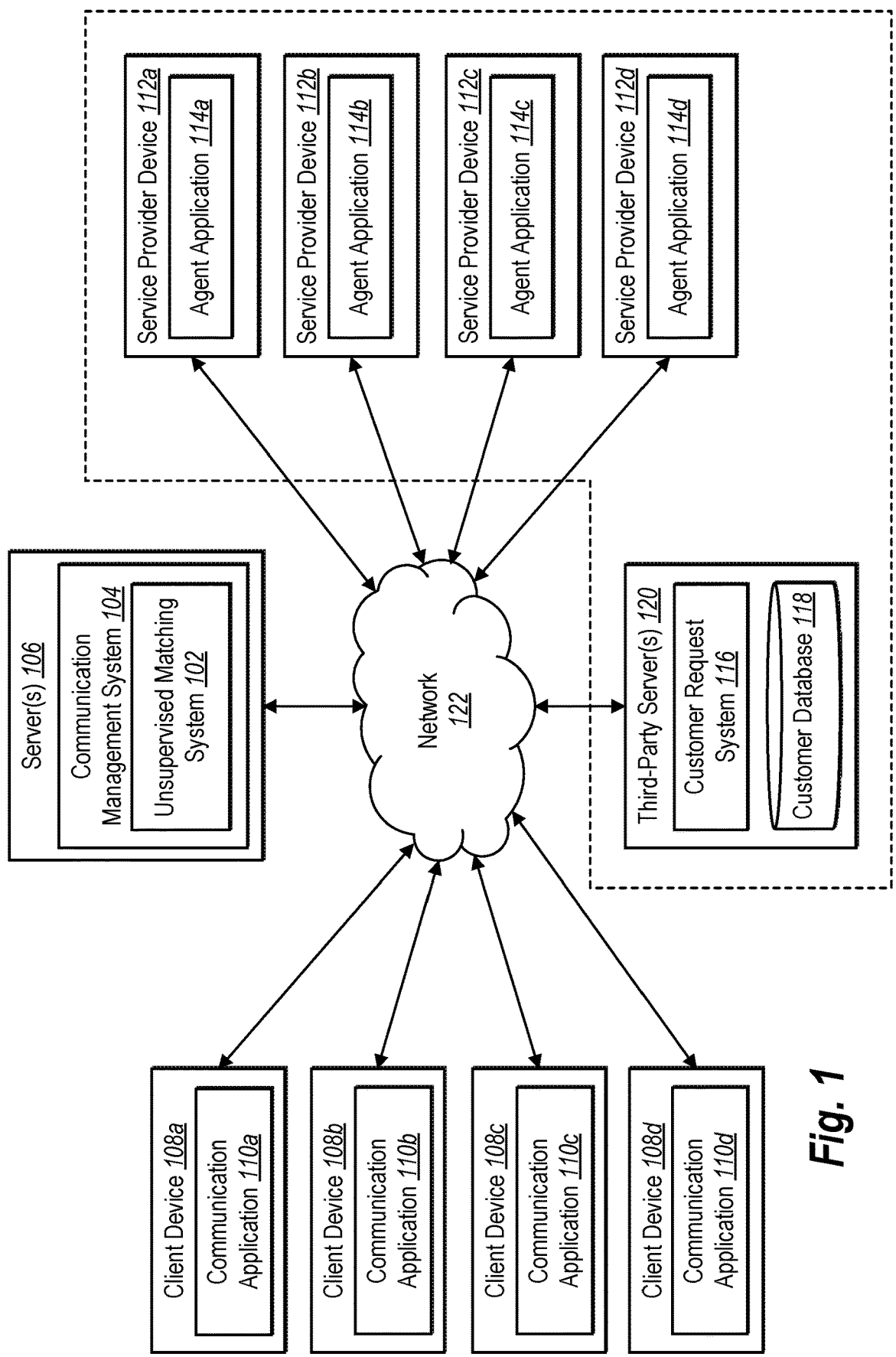
FIG. 1 illustrates an example environment in which an unsupervised matching system operates in accordance with one or more embodiments.

One or more embodiments of the present disclosure includes a featureless matching system that utilizes machine learning (e.g., supervised learning, unsupervised learning, trained neural networks) to accurately generate service provider match predictions such that an incoming communication can be efficiently routed to the predicted service provider. For example, the unsupervised matching system can train a service provider match neural network with raw communication data to generate service provider match predictions. Upon training, and when provided with a new incoming communication, the service provider match neural network can generate a service provider match prediction that is based on raw communication data, rather than attribute or profile information associated with the communication or the predicted service provider. Thus, the unsupervised matching system avoids the pitfalls of conventional systems by accurately, flexibly, and efficiently generating service provider matches and routing incoming communications without relying on arbitrary and pre-defined rules and connections.

To illustrate, in one or more embodiments, the unsupervised matching system relies on raw communication data. For example, conventional systems may extract attributes associated with an incoming communication such as a location of origin (e.g., determined based on a phone number area code), a user profile (e.g., associated with a user ID), a time of day (e.g., taked from an email header), and so forth. A conventional system may then utilize these extracted attributes to route the communication to a service provider who satisfies a pre-defined rule associated with those extracted attributes.

Instead of this attribute-based approach, various embodiments of the unsupervised matching system matches and routes an incoming communication based on raw communication data associated with that communication. For example, if the incoming communication is a telephone call, the unsupervised matching system utilizes raw audio data associated with that telephone call to route the incoming communication. Similarly, if the incoming communication is a video communication or a text communication, the unsupervised matching system utilizes the raw video data or raw text data associated with the communication to route the incoming communication.

As mentioned, in at least one embodiment, the unsupervised matching system provides the raw communication data associated with an incoming communication to a trained service provider match neural network to generate a service provider match prediction. In one or more embodiments, the unsupervised matching system trains the service provider match neural network to generate service provider match predictions utilizing raw communication training data and corresponding service provider match markers. Specifically, the unsupervised matching system applies the service provider match neural network to input vectors associated with raw communication training data. Upon receiving a service provider match prediction from the service provider match neural network, the unsupervised matching system compares the service provider match prediction to the service provider match marker associated with the raw communication training data. The unsupervised matching system can then modify parameters of the service provider match neural network based on the comparison.

After training the service provider match neural network, the unsupervised matching system can apply the service provider match neural network to new incoming communications in order to generate service provider match predictions. With each prediction, the unsupervised matching system can either route the communication to the predicted service provider, or can provide the service provider match prediction to a third-party customer request system for further use. In at least one embodiment, the unsupervised matching system may determine that a predicted service provider is not available to receive an incoming communication. In that event, the unsupervised matching system can modify one or more parameters of the service provider match neural network in order to generate a second service provider match prediction so that the unsupervised matching system routes the communication to the best available service provider based on the raw communication data.

The unsupervised matching system provides many advantages and benefits over conventional systems and methods. For example, by utilizing raw communication data to generate service provider match predictions, the unsupervised matching system improves accuracy relative to conventional systems. Specifically, the unsupervised matching system can accurately generate a service provider match prediction for an incoming communication, even when no additional attributes are known about incoming communication. Rather, the unsupervised matching system generates service provider match predictions based wholly on the raw communication data associated with the communication.

Moreover, by avoiding the attribute-based approach of conventional systems, the unsupervised matching system improves flexibility relative to conventional systems. For example, as discussed above, conventional systems are rigidly tied to attribute-based rules and pre-defined connections in routing incoming communications. As such, conventional systems are unable to route incoming communications with no associated attributes, or simply routes the communication based on no logic. Conversely, the unsupervised matching system flexibly matches and routes a communication based on that communication's raw communication data. Furthermore, by generating service provider match predictions based on raw communication data, the unsupervised matching system improves efficiency relative to conventional systems. Specifically, the unsupervised matching system does not waste system resources in routing communications to service providers who are poor matches, which causes additional transfers and/or additional communication based on the poor match.

As illustrated by the foregoing discussion, the present disclosure utilizes a variety of terms to describe features and advantages of the unsupervised matching system. Additional detail is now provided regarding the meaning of such terms. For example, as used herein, the term "communication" refers to any type of communication that the unsupervised matching system receives from a contacting user. For example, a communication can be a phone call (e.g., VoIP, cellular, POTS), a chat message, a text message (e.g., SMS), video call data (e.g., a video stream), an instant message (e.g., via social media), or any other type of electronic communication.

As mentioned above, the unsupervised matching system utilizes raw communication data associated with a communication. As used herein, the term "raw communication data" refers to non-attribute based information associated with a communication. For example, raw communication data extracted from a phone call communication can include a digital recording of at least a portion of the audio of the phone call. Similarly, raw communication data extracted from a text message can include digital information representing the textual contents of the message. Similarly, raw communication data can include an analysis of video data and/or image data.

Additionally, as used herein, the term "contacting user" refers to a user that contacts the unsupervised matching system. A contacting user can refer to a user that is experiencing a problem or issue with a service system and that contacts the unsupervised matching system in an attempt to resolve the problem or to inform others of the problem. For example, a contacting user can include a caller, a text chat user, a video chat user, or a text message user that sends a communication to the unsupervised matching system. As used herein, the term "service provider" refers to a user who provides a specific type of service via phone, text, and/or video. For example, a service provider may be a customer service representative who provides technical support to contacting users over the telephone. In another example, a service provider may be a personal shopper who curates clothing choices for a contacting user over a video chat.

As mentioned above, the unsupervised matching system can utilize various machine learning techniques to generate service provider match predictions. For example, in one embodiment, the unsupervised matching system may not be unsupervised. For instance, the matching system may utilize supervised machine learning to generate provider match predictions from raw data. To illustrate, in supervised machine learning, the matching system utilizes known inputs and known outputs (e.g., monitored raw data and match predictions collected over time) to "learn" a mapping function such that the matching system can predict new outputs (e.g., new provider match predictions) when presented with new inputs (e.g., new raw data).

Alternatively, the matching system may be unsupervised. For example, the matching system may utilize known inputs with no corresponding outputs in order to model underlying functions such that when presented with new inputs (e.g., new raw data), the model can generate provider match predictions. In some embodiments, this type of unsupervised learning is also called "deep learning" and may include one or more neural networks. Although as described herein, the unsupervised matching system utilizes one or more neural networks to generate provider match predictions, it will be understood that in alternative embodiments, the matching system can utilize other types of machine learning to generate provider match predictions, as discussed above.

As used herein, the term "neural network" refers to a machine learning model that can be tuned (e.g., trained) based on inputs to approximate unknown functions. In particular, the term neural network can include a model of interconnected artificial neurons (or layers) that communicate and learn to approximate complex functions and generate outputs based on a plurality of inputs provided to the model. In particular, a neural network includes a computer-implemented algorithm that implements deep learning techniques to analyze input (e.g., training input encoded as a neural network input vector) to make predictions and that improves in accuracy by comparing generated predictions against ground truth data and modifying internal parameters for subsequent predictions. In some embodiments, a neural network can employ supervised learning, while in other embodiments a neural network can employ unsupervised learning or reinforced learning. Examples of neural networks include deep convolutional neural networks, generative adversarial neural networks, and recurrent neural networks.

Relatedly, the term "train" refers to utilizing information to tune or teach a neural network. The term "training" (used as an adjective or descriptor, such as "training data") refers to information or data utilized to tune or teach the neural network. In some embodiments, the unsupervised matching system trains the service provider match neural network to generate accurate service provider match predictions based on respective training data.

As mentioned above, the unsupervised matching system trains the service provider match neural network with raw communication training data and corresponding service provider match markers. As used herein, "raw communication training data" refers to raw communication data associated with a communication that has previously been matched with and/or routed to a service provider with optimized results. Also as used herein, a "service provider match marker" refers to a ground truth associated with the corresponding raw communication data. To illustrate, a service provider match marker can include a service provider ID and/or information associated with the service provider to whom the communication associated with the corresponding raw communication training data was previously routed.

Additional detail regarding the communication management system will now be provided with reference to the figures. For example, FIG. 1 illustrates a schematic diagram of an example environment for implementing an unsupervised matching system 102 in accordance with one or more embodiments. An overview of the unsupervised matching system 102 is described in relation to FIG. 1. Thereafter, a more detailed description of the components and processes of the unsupervised matching system 102 is provided in relation to the subsequent figures.

As shown in FIG. 1, the environment includes a server(s) 106, client devices 108a-108d, service provider devices 112a-112d, the third party server(s) 120, and a network 122. Each of the components of the environment can communicate via the network 122, and the network 122 may be any suitable network over which computing devices can communicate. Example networks are discussed in more detail below in relation to FIGS. 8 and 9.

As mentioned, the environment includes different user devices such as the client devices 108a-108d and the service provider devices 112a-112d. The client devices 108a-108d can be a one of a variety of computing devices, including a smartphone, tablet, smart television, desktop computer, laptop computer, virtual reality device, augmented reality device, or other computing device as described in relation to FIGS. 8 and 9. Although FIG. 1 illustrates a four client devices 108a, 108b, 108c, and 108d, in some embodiments the environment can include additional or fewer client devices, each associated with a different contacting user. The client devices 108a-108d can each receive user input and other information and provide the information (including a communication) to the server(s) 106. Thus, the unsupervised matching system 102 on the server(s) 106 can receive communications to use in generating service provider match predictions and routing guidance.

As shown, each of the client devices 108a-108d include a communication application (e.g., the communication applications 110a, 110b, 110c, and 110d, respectively). In particular, the communication applications 110a-110d may be web applications, native applications installed on the client devices 108a-108d (e.g., mobile applications, desktop applications, etc.), or cloud-based applications where part of the functionality is performed by the server(s) 106 and/or the third party server(s) 120. The communication applications 110a-110d can present or display information to a contacting user, including information relating to options for creating and processing a communication to help a contacting user accomplish a desired purpose. A contacting user can interact with one of the communication applications 110a-110d to provide a communication that, for example, includes a customer service request.

As also mentioned, the environment includes the service provider devices 112a, 112b, 112c, and 112d. Like the client devices 108a-108d, the service provider devices 112a-112d can each be one of a variety of computing devices, including a smartphone, tablet, smart television, desktop computer, laptop computer, virtual reality device, augmented reality device, or other computing device as described in relation to FIGS. 8 and 9. Although FIG. 1 illustrates four service provider devices 112a-112d, in some embodiments the environment can include additional or fewer service provider devices, each associated with a different service provider. The service provider devices 112a-112d can each receive user input from a service provider and can receive information (including a communication, contacting user information, a service provider match prediction, and/or other information) from the server(s) 106 and/or the third party server(s) 120.

As shown, the service provider devices 112a-112d include an agent application (e.g., the agent applications 114a, 114b, 114c, and 114d, respectively). In particular, each of the agent applications 114a-114d may be a web application, a native application installed on an agent device (e.g., a mobile application, a desktop application, etc.), or a cloud-based application where part of the functionality is performed by the server(s) 106 and/or the third party server(s) 120. The agent applications 114a-114d can present or display information to a service provider, including a user interface for interacting with a contacting user and presenting information pertaining to the contacting user (e.g., a routed communication, raw communication data, etc.). A service provider can interact with one of the agent applications 114a-114d to, for example, help a contacting user reschedule a flight or replace a defective product.

As illustrated in FIG. 1, the environment includes a third party server(s) 120 hosting a customer request system 116 and a customer database 118. The customer request system 116 may be a service system or a different customer support system. For example, the customer request system 116 may be a service system that a contacting user needs to contact to resolve an issue stemming from a problem of a different system—e.g., an airline system that a contacting user calls to reschedule a flight due to being stuck in traffic. In some embodiments, as indicated by the dashed box of FIG. 1, the service provider devices 112a-112d are associated or affiliated with the customer request system 116. In these embodiments, the unsupervised matching system 102 may provide information such as a communication and a generated service provider match prediction to the customer request system 116, whereupon the customer request system 116 may assign or relay the communication to a service provider device (e.g., one of the service provider devices 112a-112d). In other embodiments, the service provider devices 112a-112d are not directly associated with the customer request system 116, and the unsupervised matching system 102 provides communications directly to the service provider device corresponding to service provider match predictions without necessarily utilizing the customer request system 116.

As further illustrated in FIG. 1, the environment includes the server(s) 106 hosting the communication management system 104, of which the unsupervised matching system 102 is a component. The communication management system 104 may generate, store, process, receive, and transmit electronic data, such as communications, raw communication data, and service provider match predictions. For example, the communication management system 104 may receive data from the client device 108a in the form of a communication. In addition, the communication management system 104 can transmit data to one or more of the service provider devices 112a-112d and/or the servicer(s) 120 to provide the communication and a generated service provider match prediction. The communication management system 104 can communicate with the client devices 108a-108d, the service provider devices 112a-112d, and the third party server(s) 120 via the network 122. In some embodiments, the server(s) 106 hosting the communication management system 104 comprises an application server, a communication server, a web-hosting server, a social networking server, a digital content campaign server, or a digital content management server.

Although FIG. 1 depicts the unsupervised matching system 102 within the communication management system 104 and located on the server(s) 106, in some embodiments, the unsupervised matching system 102 may be implemented by (e.g., located entirely or in part) on one or more other components of the environment. For example, the unsupervised matching system 102 may be implemented by any of the client devices 108a-108d, the service provider devices 112a-112d, and/or the third party server(s) 120.

In some embodiments, though not illustrated in FIG. 1, the environment may have a different arrangement of components and/or may have a different number or set of components altogether. For example, the client devices 108a-108d, the service provider devices 112a-112d, and the third party server(s) 120 may communicate directly with the unsupervised matching system 102, bypassing the network 122. Additionally, the unsupervised matching system 102 can include one or more databases (e.g., a database to store contacting user information, contextual information, and/or generated purpose predictions) housed on the server(s) 106 or elsewhere in the environment. The unsupervised matching system 102 can be implemented in a variety of different ways across the server(s) 106, the network 122, the service provider devices 112a-112d, the client devices 108a-108d, and the third party server(s) 120. Additional detail regarding implementing different components of the unsupervised matching system 102 across devices is provided below.

Figure 2:
FIG. 2 illustrates a flowchart of a series of acts in routing a communication to a matched service provider in accordance with one or more embodiments.

As discussed above, the unsupervised matching system 102 can generate service provider match predictions based on raw communication data. For instance, FIG. 2 illustrates an overview of the unsupervised matching system 102 generating service provider match predictions. Specifically, FIG. 2 illustrates the unsupervised matching system 102 performing an act 202 of receiving a communication from a client device. For example, in one or more embodiments, the unsupervised matching system 102 receives a communication directly from a client device (e.g., one of the client devices 108a-108d shown in FIG. 1). Alternatively or additionally, the unsupervised matching system 102 can receive communications from client devices via the customer request system 116. As mentioned above, in one or more embodiments, a communication can be auditory, textual, or video-based.

As shown in FIG. 2, after receiving the communication, the unsupervised matching system 102 performs an act 204 of matching the communication to a service provider. For example, as mentioned above and in at least one embodiment, the unsupervised matching system 102 matches the communication to a service provider by extracting raw communication data associated with the communication and providing the extracted raw communication data to a trained service provider match neural network. In response to receiving the raw communication data, the service provider match neural network can generate a service provider match prediction that indicates an optimal service provider who should be routed the communication.

Based on the output of the service provider match neural network, the unsupervised matching system 102 performs the act 206 of routing the communication to the matched service provider. For example, in one embodiment, the unsupervised matching system 102 routes a communication directly to the matched service provider. In that case, the unsupervised matching system 102 can provide the communication to the matched service provider via the agent application (e.g., one of the agent applications 114a-114d shown in FIG. 1) installed on the service provider's service provider device. Additionally or alternatively, the unsupervised matching system 102 can route the communication to the matched service provider via the customer request system 116. In that case, the unsupervised matching system 102 can provide the communication along with the service provider match prediction to the customer request system 116, or can provide only the service provider match prediction if the customer request system 116 already has the communication (i.e., the customer request system 116 originally forwarded the communication to the unsupervised matching system 102).

Figure 3:
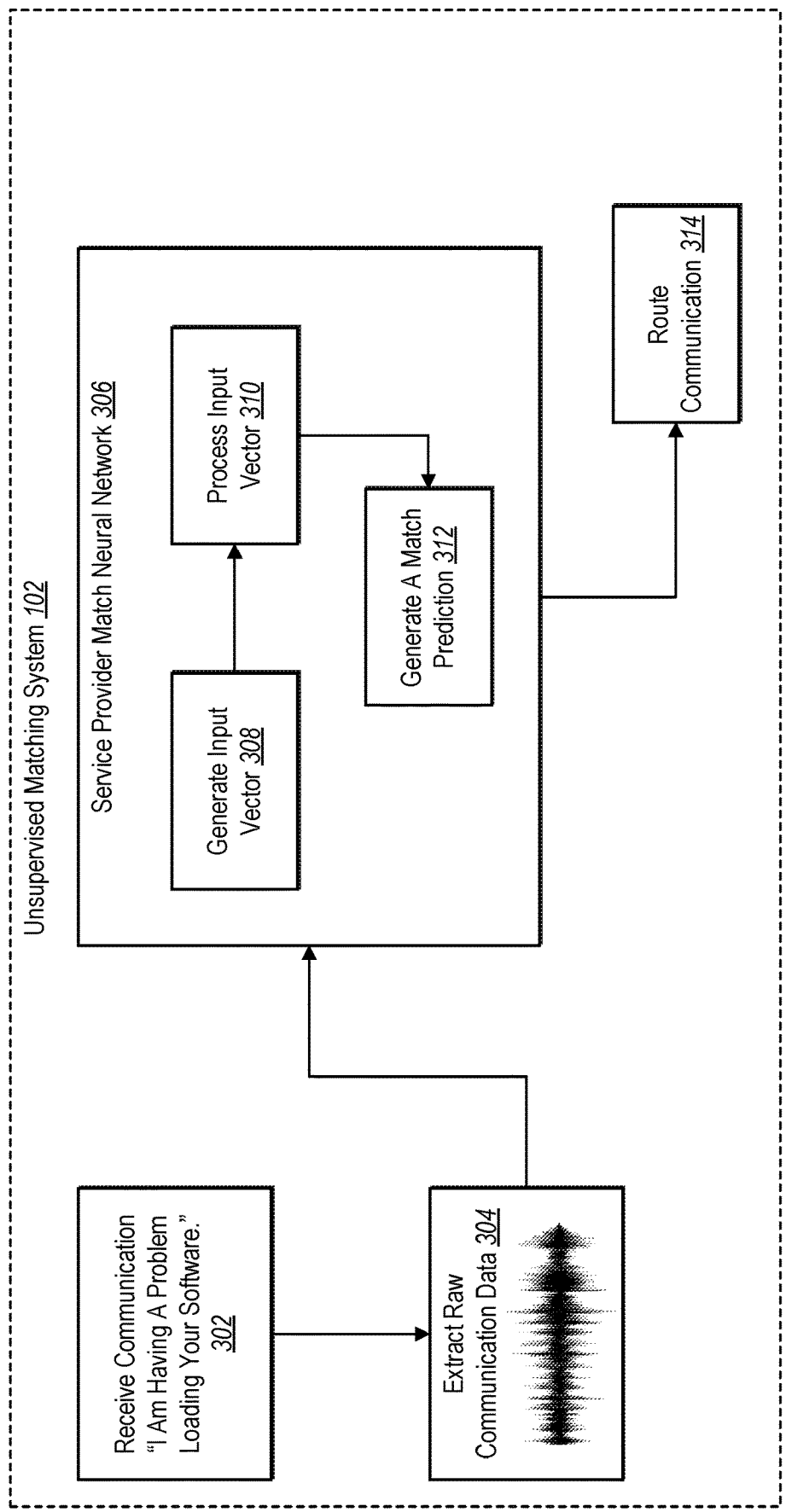
FIG. 3 illustrates a diagram of generating a service provider match prediction in accordance with one or more embodiments.

FIG. 3 illustrates additional detail with regard to generating service match predictions in accordance with one or more embodiments. For example, FIG. 3 shows the unsupervised matching system 102 performs an act 302 of receiving an auditory communication (e.g., a live or recorded phone call with a person speaking the words "I'm having a problem loading your software"). As mentioned above, in additional or alternative embodiments, the unsupervised matching system 102 can receive textual communications (e.g., as an SMS text message, email message, or other electronic message) and/or visual communications (e.g., as streaming or recorded video).

In response to receiving the communication 302, the unsupervised matching system 102 performs an act 304 of extracting raw communication data. In one or more embodiments, the unsupervised matching system 102 extracts the raw communication data directly from the received communication. For example, the unsupervised matching system 102 can sample a portion of a live analog audio stream and can convert the sample to a digital file. More specifically, the unsupervised matching system 102 can convert the same to a digital file by mapping the height of the analog sound waves to a set of positive and negative integers that replicate the wave in digital form.

Additionally or alternatively, rather than extracting the raw communication data directly from the received communication, the unsupervised matching system 102 can utilize the communication from a client device to identify stored raw communication data associated with the client device. For example, in at least one embodiment, the communication management system 104 and/or the customer request system 116 stores raw communication data associated with client devices in a central repository (e.g., the customer database 118). In that embodiment, upon receiving the communication from the client device, the unsupervised matching system 102 can determine a user identifier (e.g., a phone number, a profile name, an account number) associated with the client device. The unsupervised matching system 102 can then utilize the user identifier to extract the corresponding raw communication data from the repository.

With the raw communication data associated with the communication extracted, the unsupervised matching system 102 provides the raw communication data to the service provider match neural network 306. As shown in FIG. 3, and as an initial act 308, the service provider match neural network 306 performs the act 308 of generating an input vector based on the raw communication data. In one or more embodiments, the service provider match neural network 306 generates an input vector by encoding information from the raw communication data into a fixed-length vector representation. For example, the service provider match neural network 306 can generate the input vector by randomly sampling a portion of the raw communication data and embedding the sampled portion into a fixed-length input vector.

After generating the input vector, the service provider match neural network 306 performs the act 310 of processing the input vector. For example, the service provider match neural network 306 can process the input vector by providing the input vector to an input neural network layer, and causing the subsequent layer output to be provided to subsequent processing layers within the service provider match neural network 306 (e.g., LSTM layers, BiMax pooling layers, etc.).

Next, the service provider match neural network 306 performs the act 312 of generating a service provider match prediction. As mentioned above, the one or more processing layers of the service provider match neural network 306 ultimately output a service provider match prediction. In one or more embodiments, service provider match neural network 306 generates a service provider match prediction including a service provider identifier (e.g., an employee number, a service provider device ID). Additionally or alternatively, the service provider match neural network 306 can generate a service provider match prediction including a service provider's name, or characteristics of the service provider, as will be explained in detail below.

With the service provider match prediction, the unsupervised matching system 102 can perform the act 314 of routing the communication. As mentioned above, the unsupervised matching system 102 can route the communication directly to the predicted service provider. Additionally or alternatively, the unsupervised matching system 102 can route the communication by providing the service provider match prediction to the customer request system 116 hosted on the third-party server 120.

Figure 4A:
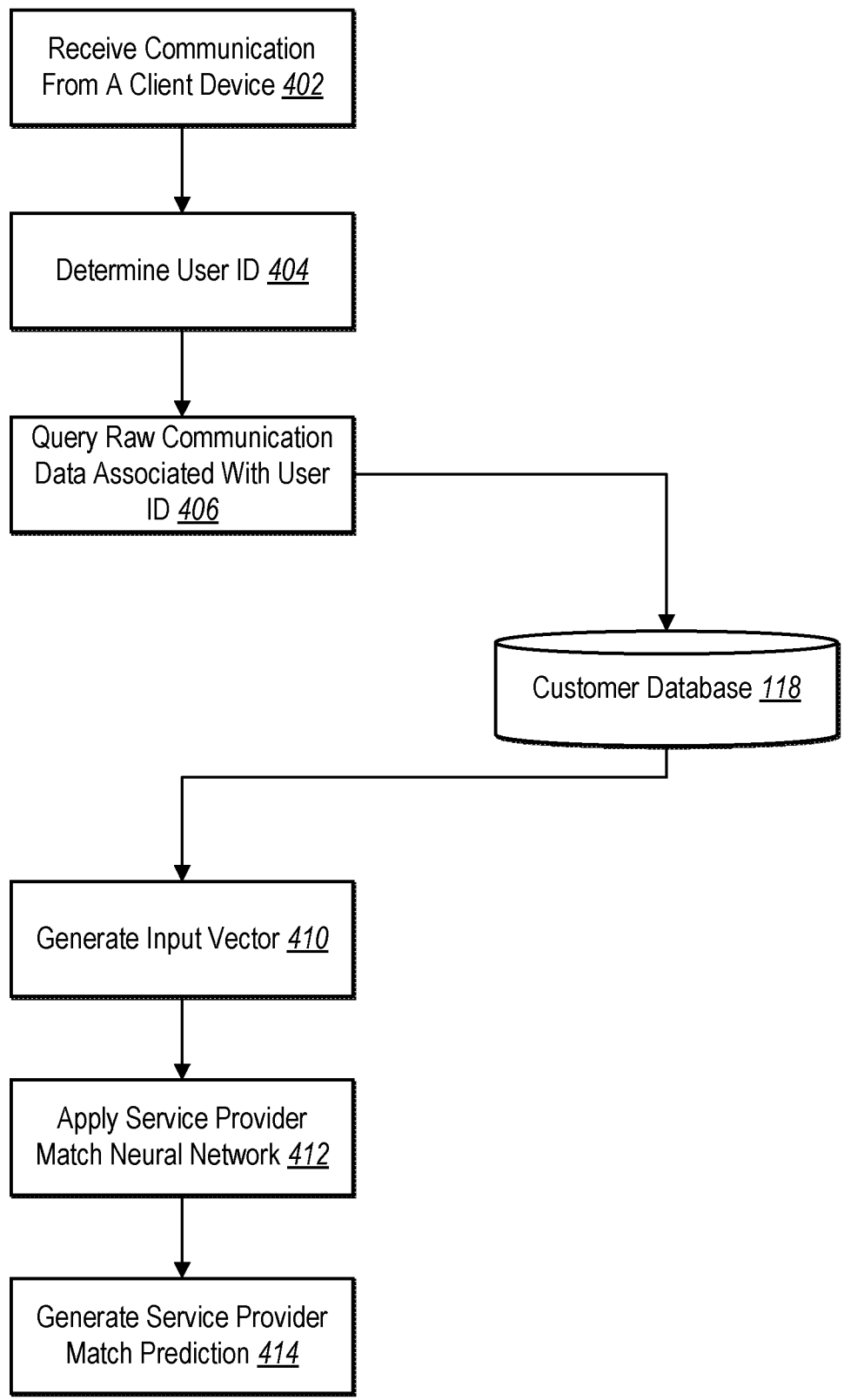
FIG. 4A illustrates a flowchart of a series of acts in utilizing raw communication data to generate a service provider match prediction in accordance with one or more embodiments.

FIG. 4A illustrates additional detail with regard to generating service provider match predictions. For example, FIG. 4A shows the unsupervised matching system 102 performing the act 402 of receiving a communication from a client device. As discussed above, the communication may be a phone call, a text message, a social media communication, a video stream, a video recording, and so forth.

As illustrated in FIG. 4A and in response to receiving the communication from the client device, the unsupervised matching system 102 next performs the act 404 of determining a user ID associated with the communication. For example, in at least one embodiment, rather than expending additional time and computing resources in extracting raw communication data from an incoming communication, the unsupervised matching system 102 stores raw communication data associated with users over time. As discussed above, the unsupervised matching system 102 can store this accumulated raw communication data in a central repository (e.g., the customer database 118). Additionally or alternatively, the customer request system 116 may collect and store raw communication data over time in the customer database 118.

In one or more embodiments, the unsupervised matching system 102 may store the collected raw communication data in various ways. For example, the unsupervised matching system 102 may store raw communication data based on user IDs. For instance, a client's user ID may be a telephone number (e.g., a telephone number associated with the client's client device if the client device is capable of making phone calls). Additionally or alternatively, a client's user ID may be an account number, a profile name, an email address, a screen name, a date of birth, or any other unique identifier.

In at least one embodiment, the unsupervised matching system 102 determines a user ID associated with a communication by analyzing data included in and/or associated with the communication. For example, if the communication is an email, the unsupervised matching system 102 may determine the user ID associated with the email by analyzing header information included with the email to extract an email address associated with the sender. In another example, if the communication is an incoming video stream, the unsupervised matching system 102 may determine the user ID associated with the video stream by analyzing data packet information associated with the video stream to extract an IP address, an account number, or a screen name. Moreover, in some embodiments, if the communication includes visual data (e.g., such as with a digital image or video), the unsupervised matching system 102 may determine the user ID associated with the communication by performing image analysis techniques (e.g., facial recognition) in connection with the communication.

Once the unsupervised matching system 102 has determined a user ID associated with the received communication, the unsupervised matching system 102 can perform the act 406 of querying raw communication associated with the user ID from the repository of raw communication data. For example, as shown in FIG. 4A, the unsupervised matching system 102 can generate and submit a database query based on the user ID to the customer database 118.

In one or more embodiments, the unsupervised matching system 102 queries a predetermined unit of raw communication data from the customer database 118 that is associated with the user ID. For example, if the received communication is a phone call, the unsupervised matching system 102 may query ten seconds of raw audio data associated with the calling client from the customer database 118. In another example, if the received communication is an SMS text message, the unsupervised matching system 102 may query 50 characters of raw textual data associated with the calling client from the customer database 118.

After querying the raw communication data from the data repository, the unsupervised matching system 102 performs the act 410 of generating an input vector. As discussed above, the unsupervised matching system 102 generates an input vector for the service provider match neural network 306 that is configured or packaged in a manner that is customized to the input layer of the service provider match neural network 306. It should be noted that, at this point, the unsupervised matching system 102 no longer relies on the determined user ID in generating the service provider match prediction. Rather, as discussed above, the service provider match neural network 306 generates the service provider match prediction based on the raw communication data included in the input vector. As such, the unsupervised matching system 102 next performs the acts 412 and 414 of applying the service provider match neural network 306 to the generated input vector and generating the service provider match prediction, as discussed above.

Figure 4B:
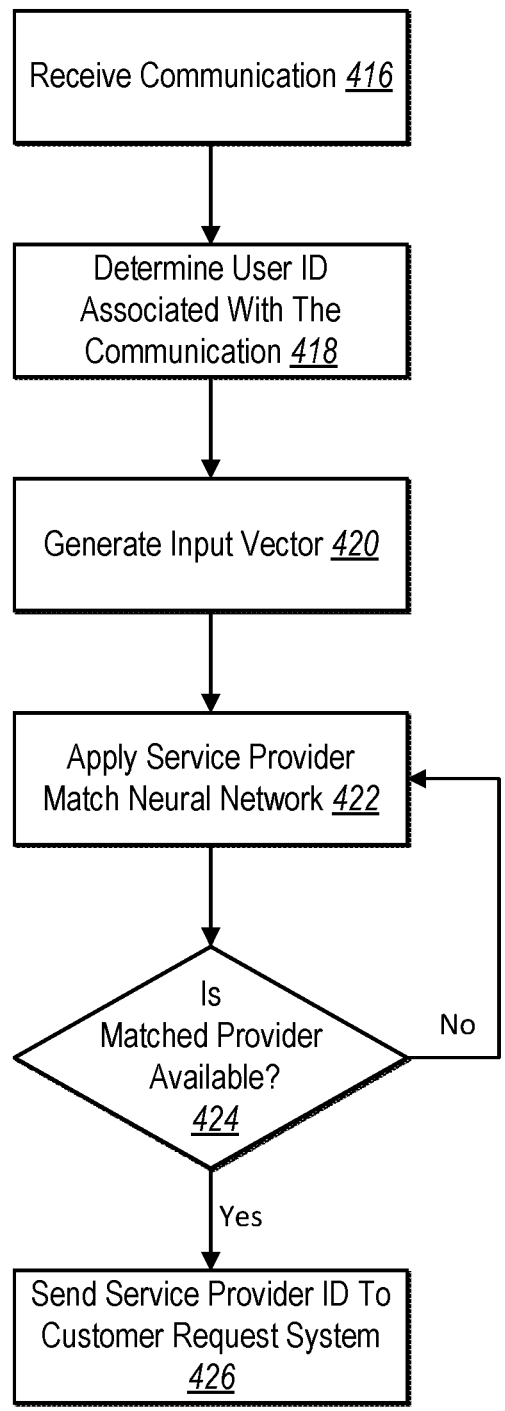
FIG. 4B illustrates a flowchart of a series of acts in routing a communication based on a generated service provider match prediction in accordance with one or more embodiments.

FIG. 4B illustrates additional features of the unsupervised matching system 102. In one or more embodiments, the service provider indicated by a service provider match prediction may not be available to receive a communication. For example, if the matched service provider is a customer service agent who responds to phone calls, the service provider may still be on a previously received phone call when the unsupervised matching system 102 matches that service provider to a newly received communication. Likewise, the matched service provider may be unavailable due to being on a break or out sick. In those instances, the unsupervised matching system 102 can generate alternative service provider match predictions.

For example, as illustrated in FIG. 4B, the unsupervised matching system 102 can perform the acts 416, 418, and 420 of receiving a communication, determining a user ID associated with the communication, and generating an input vector, as described above with reference to FIG. 4A. At act 422, the unsupervised matching system 102 applies the service provider match neural network 306 to the generated input vector in order to generate a service provider match prediction. As discussed above, the generated service provider match prediction can include a service provider ID, a service provider device ID (e.g., MAC address, IP address), a service provider name, or any other identifying information associated with the matched service provider.

At this point, the unsupervised matching system 102 performs the act 424 of determining whether the matched service provider is available to receive the communication. In one or more embodiments, the unsupervised matching system 102 makes this determination by providing the generated service provider match predication to the customer request system 116 and then receiving an indication from the customer request system 116 that the matched service provider is unavailable. Additionally or alternatively, the unsupervised matching system 102 can make this determination by contacting the matched service provider directly and receiving an indication from the service provider that he or she is unavailable. Additionally or alternatively, the unsupervised matching system 102 can make this determination by contacting the matched service provider directly and receiving no response from the matched service provider after a threshold amount of time. Additionally or alternatively, the unsupervised matching system 102 can make this determination by accessing information (e.g., timekeeping information, human resources information, etc.) that indicates whether a matched service provider is out sick, on vacation, or on a scheduled break.

If the unsupervised matching system 102 determines that the matched service provider is available (e.g., "Yes"), the unsupervised matching system 102 performs the act 426 of sending the service provider ID (e.g., indicated by the generated service provider match prediction) to the customer request system 116. As discussed above, in the event that the unsupervised matching system 102 does not contact the service providers directly, the unsupervised matching system 102 can provide match and routing information to the customer request system 116 hosted by the third-party server(s) 120.

If the unsupervised matching system 102 determines that the matched service provider is not available (e.g., "No"), the unsupervised matching system 102 again performs the act 422 of applying the service provider match neural network to the generated input vector. For example, in at least one embodiment, the service provider match neural network 306 includes latent memory features that "remember" matched service providers for a threshold amount of time. As such, when the unsupervised matching system 102 applies the service provider match neural network 306 to the same input vector within a predetermined period of time (e.g., 5 seconds), the service provider match neural network can remove the previously matched service provider from consideration. In that scenario, the service provider match neural network 306 can generate a service provider match prediction that features a different service provider. In this way, the service provider match neural network 306 avoids unnecessary lag.

Additionally or alternatively, in at least one embodiment, the unsupervised matching system 102 can provide service provider available information as part of the input vector. For example, the unsupervised matching system 102 can generate the input vector (e.g., in the act 420) to include raw communication data associated with the received communication as well as human resources information indicating the service providers currently available. In at least one embodiment, the unsupervised matching system 102 can update the input vector each time the service provider match neural network 306 is applied to include the most up-to-date availability information. In one or more embodiments, the unsupervised matching system 102 can continue to apply the service provider match neural network to the input vector until the unsupervised matching system 102 determines that the matched service provider is available in act 424.

Figure 5:
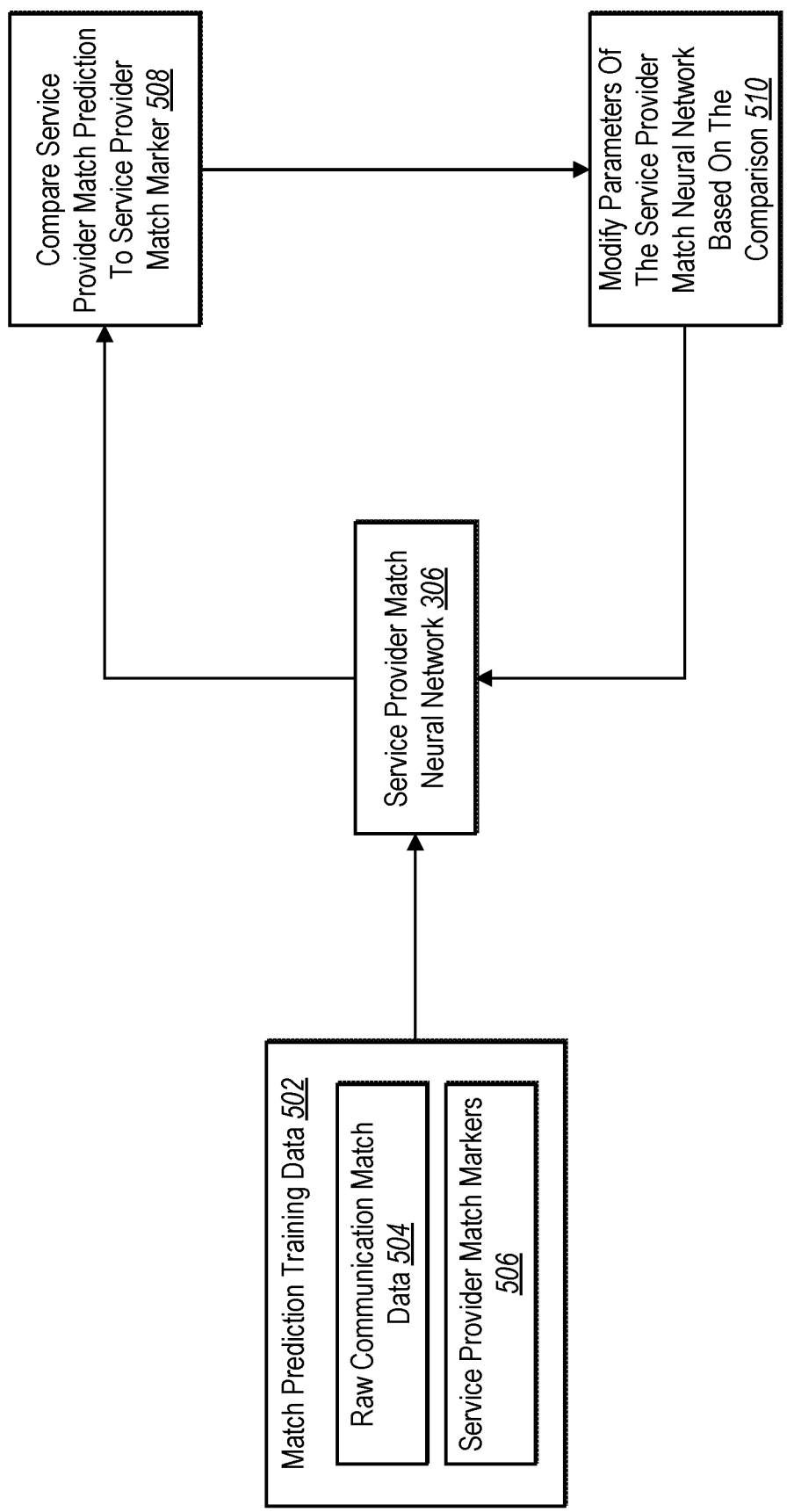
FIG. 5 illustrates a diagram of training a service provider match neural network in accordance with one or more embodiments.

As discussed above, the unsupervised matching system 102 can train a service provider match neural network 306 to generate service provider match predictions. For instance, FIG. 5 illustrates training a service provider match neural network 306 in accordance with one or more embodiments. Specifically, as shown in FIG. 5, the unsupervised matching system 102 identifies the match prediction training data 502. For example, as mentioned above, the unsupervised matching system 102 trains the service provider match neural network 306 based on raw communication match data 504 and service provider match markers 506. In one or more embodiments, the unsupervised matching system 102 trains the service provider match neural network 306 by providing an instance of raw communication match data to the service provider match neural network 306 as an input vector, comparing the output of the service provider match neural network 306 to the service provider match marker that corresponds to the instance of raw communication match data, and then modifying the parameters of the service provider match neural network 306 based on the comparison. This process will now be described in greater detail.

As shown in FIG. 5, the match prediction training data 502 includes raw communication match data 504 and service provider match markers 506. In one or more embodiments, the raw communication match data 504 includes instances of raw communication data associated with previously received communications routed to service providers. For example, an instance of raw communication match data 504 may include a sample (e.g., 5 seconds) of recorded phone call audio, a portion (e.g., 50 characters) of a textual communication such as an SMS text message or email, or a sample (e.g., 25 frames) of a video recording.

Each instance of raw communication match data 504 corresponds to a service provider match marker 506. For example, every sample of recorded audio corresponds to a service provider match marker 506 that includes a ground truth (e.g., a service provider ID, or attributes of the predicted service provider) associated with that sample of recorded audio. Similarly, every portion of textual data and/or video data in the raw communication match data 504 corresponds to a service provider match marker 506 including the ground truth associated with that sample.

To begin training the service provider match neural network 306, the unsupervised matching system 102 provides an instance of raw communication match data 504 to the service provider match neural network 306. As discussed above, the service provider match neural network 306 may include the functionality to generate an input vector from received raw communication data. Accordingly, in response to receiving the instance of raw communication match data 504, the service provider match neural network 306 may generate an input vector, and pass the generated input vector to an input layer of the service provider match neural network 306.

Depending on the structure of the service provider match neural network 306, the service provider match neural network 306 may process the generated input vector in a number of ways. For example, in one embodiment, the service provider match neural network 306 may pass latent feature vectors between sequential processing layers of the service provider match neural network 306. Additionally, the service provider match neural network 306 may pool prediction results (e.g., in a max pooling layer), and generate a service provider match prediction.

After the service provider match neural network 306 generates a service provider match prediction, the unsupervised matching system 102 continues to train the service provider match neural network 306 by performing the act 508 of comparing the service provider match prediction to a corresponding service provider match marker. For example, as discussed above, for each instance of raw communication match data 504, the match prediction training data 502 includes a corresponding service provider match marker 506. Each service provider match marker 506 includes a ground truth indicating a service provider to whom a corresponding communication was successfully routed.

As mentioned above, a communication is "successfully" routed when a positive metric results from the communication being routed to a particular service provider. For example, depending on the type of service provided by a service provider, a positive metric may be a successfully resolved customer service issue, a successful sale, a positive product review, a first-time service scheduling, a re-scheduling of a service, a re-booking of a ticket, and so forth.

As such, the act 508 can involve the unsupervised matching system 102 determining whether the service provider match prediction generated by the service provider match neural network 306 is the same as the service provider match marker 506 corresponding to the raw communication match data 504 provided to the service provider match neural network 306. The unsupervised matching system 102 can determine that the generated prediction is the same as the corresponding marker by utilizing a direct character comparison (e.g., via OCR). In additional embodiments, the unsupervised matching system 102 can determine that the generated prediction is the same as the corresponding marker if the generated prediction is "close enough." For example, if the generated prediction and the corresponding marker both include service provider attributes (e.g., nationality, age, sex) rather than a specific service provider ID, the unsupervised matching system 102 can determine that the prediction and the marker are the same if a threshold number of attributes match.

To continue training the service provider match neural network 306, the unsupervised matching system 102 performs the act 510 of modifying parameters of the service provider match neural network 306 based on the comparison performed in the act 508. For example, based on this comparison, the unsupervised matching system 102 can modify parameters of one or more layers of the service provider match neural network 306 to reduce the measure of loss.

In one or more embodiments, the unsupervised matching system 102 continues training the service provider match neural network 306 until either the match prediction training data 502 is exhausted or the measure of loss is minimized and stable over a threshold number of training cycles. The unsupervised matching system 102 may periodically retrain the service provider match neural network 306 in the same manner illustrated in FIG. 5. Once training of the service provider match neural network 306 is complete, the unsupervised matching system 102 can apply the service provider match neural network 306 to unknown raw communication inputs (e.g., raw communication inputs with no corresponding training markers).

Figure 6:
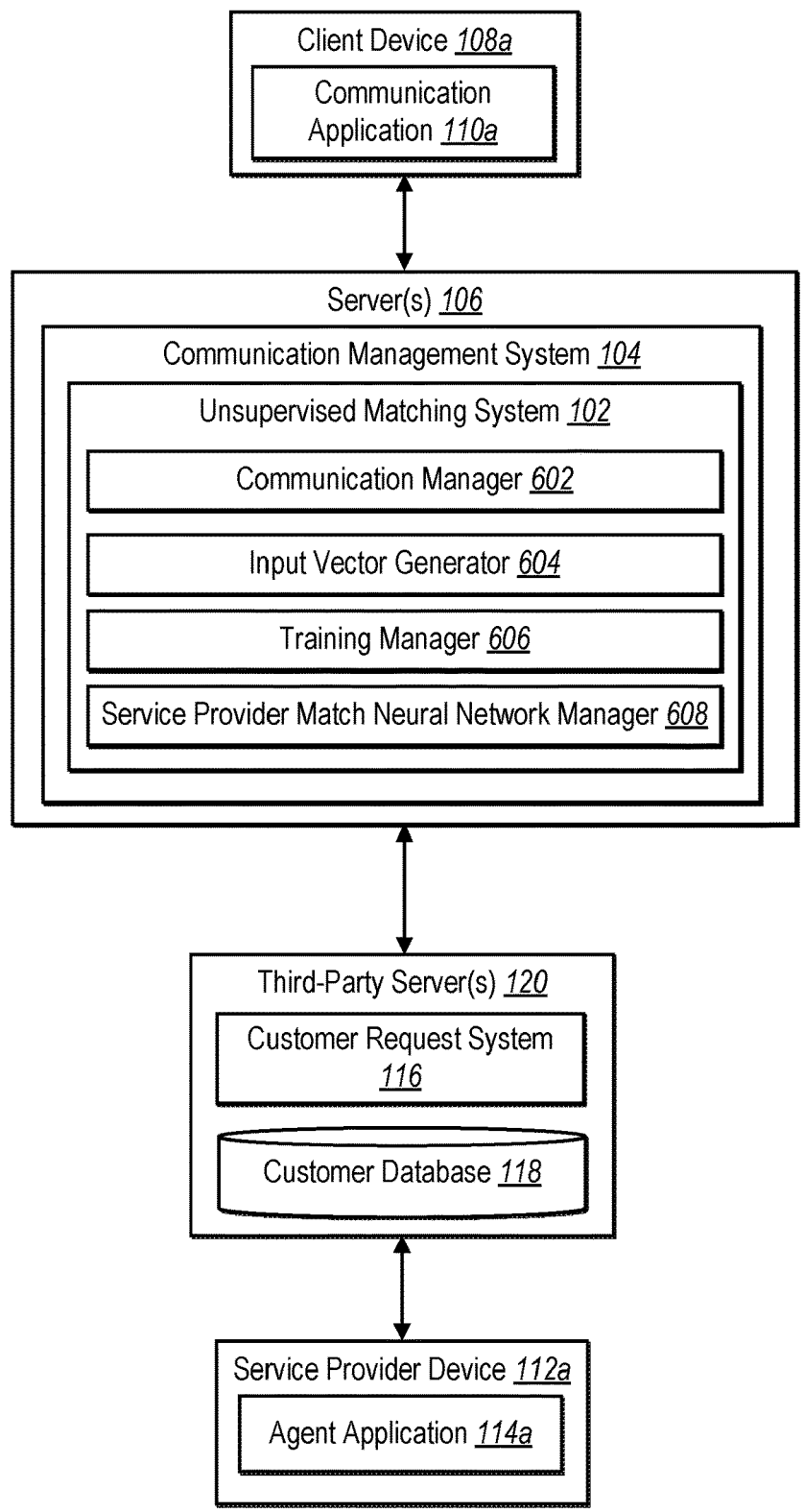
FIG. 6 illustrates a schematic diagram of the unsupervised matching system in accordance with one or more embodiments.

As described in relation to FIGS. 1-5, the unsupervised matching system 102 performs operations for training and utilizing a service provider match neural network 306 to generate service provider match predictions based on raw communication data. FIG. 6 illustrates a detailed schematic diagram of an embodiment of the unsupervised matching system 102 described above. Although illustrated on the servicer(s) 106, as mentioned above, the unsupervised matching system 102 can be implemented by one or more different or additional computing devices (e.g., the service provider device 112a). In one or more embodiments, the unsupervised matching system 102 includes a communication manager 602, an input vector generator 604, a training manager 606, and a service provider match neural network manager 608.

Each of the components 602-608 of the unsupervised management system 102 can include software, hardware, or both. For example, the components 602-608 can include one or more instructions stored on a computer-readable storage medium and executable by processors of one or more computing devices, such as a client device or server device. When executed by the one or more processors, the computer-executable instructions of the unsupervised management system 102 can cause the computing device(s) to perform the methods described herein. Alternatively, the components 602-608 can include hardware, such as a special-purpose processing device to perform a certain function or group of functions. Alternatively, the components 602-608 of the unsupervised management system 102 can include a combination of computer-executable instructions and hardware.

Furthermore, the components 602-608 of the unsupervised management system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 602-608 may be implemented as a stand-alone application, such as a desktop or mobile application. Furthermore, the components 602-608 may be implemented as one or more web-based applications hosted on a remote server. The components 602-608 may also be implemented in a suite of mobile device applications or "apps."

As mentioned above, and as shown in FIG. 6, the unsupervised matching system 102 includes a communication manager 602. In one or more embodiments, the communication manager 602 handles communications between the unsupervised matching system 102 and other computing devices. For example, the communication manager 602 can send and receive information (e.g., communications) to and from the client device 108a. To illustrate, the communication manager 602 can receive an SMS text message communication from the client device 108a via the communication application 110a. Additionally or alternatively, the communication manager 602 can send and receive information (e.g., communications, match predictions) to and from other devices and systems such as the customer request system 116 and the service provider device 112a.

As further shown in FIG. 6, the unsupervised matching system 102 includes an input vector generator 604. In one or more embodiments, the input vector generator 604 generates an input vector based on a communication received by the communication manager 602. For example, in one embodiment, the input vector generator 604 extracts raw communication data (e.g., a sample of raw audio data, a threshold number of text characters, a threshold number of digital video frames) directly from the received communication. In an additional or alternative embodiment, the input vector generator 604 extracts a user ID associated with a received communication and utilizes the user ID to query raw communication data associated with the user ID from a central repository of raw communication data. With the raw communication data extracted and/or queried, the input vector generator 604 generates an input vector specific to the service provider match neural network 306 by configuring the raw communication data into a standardized format.

As mentioned above, and as shown in FIG. 6, the unsupervised matching system 102 includes a training manager 606. In one or more embodiments, the training manager 606 utilizes raw communication match data (e.g., the raw communication match data 504 described with reference to FIG. 5) and service provider match markers (e.g., the service provider match markers 506 described with reference to FIG. 5) to train a service provider match neural network (e.g., the service provider match neural network 306). As described above, the training manager 606 trains a service provider match neural network by providing raw communication match data as input vectors to the service provider match neural network and then comparing the output of the service provider match neural network to the associated service provider match markers. Based on this comparison, the training manager 606 then modifies parameters of the service provider match neural network to reduce a measure of loss.

Furthermore, as mentioned above and as shown in FIG. 6, the unsupervised matching system 102 includes a service provider match neural network manager 608. In one or more embodiments, the service provider match neural network manager 608 maintains the service provider match neural network, and signals a need for periodic re-training to the training manager 606. For example, the service provider match neural network manager 608 can determine that the service provider match neural network requires re-training after a threshold amount of time, or after a threshold number of applications.

Although the unsupervised matching system 102 is described herein as generating service provider match predictions utilizing a service provider match neural network, in additional embodiments, the unsupervised matching system 102 can generate service provider match predictions in other ways. For example, in one alternative embodiment, the unsupervised matching system 102 can generate service provider match predictions using data segmentation and topic modeling. To illustrate, based on a defined optimization goal (e.g., sales), the unsupervised matching system 102 can develop clusters of raw communication data and corresponding service provider match predictions. The unsupervised matching system 102 can then identify one or more characteristics of each data cluster. Then when a new communication is received, the unsupervised matching system 102 can determine the best data cluster with which to associated the new communication based on one or more characteristics of the raw communication data associated with the new communication, and can generate a service provider match prediction based on the service provider match predictions within the identified cluster.

Figure 7:
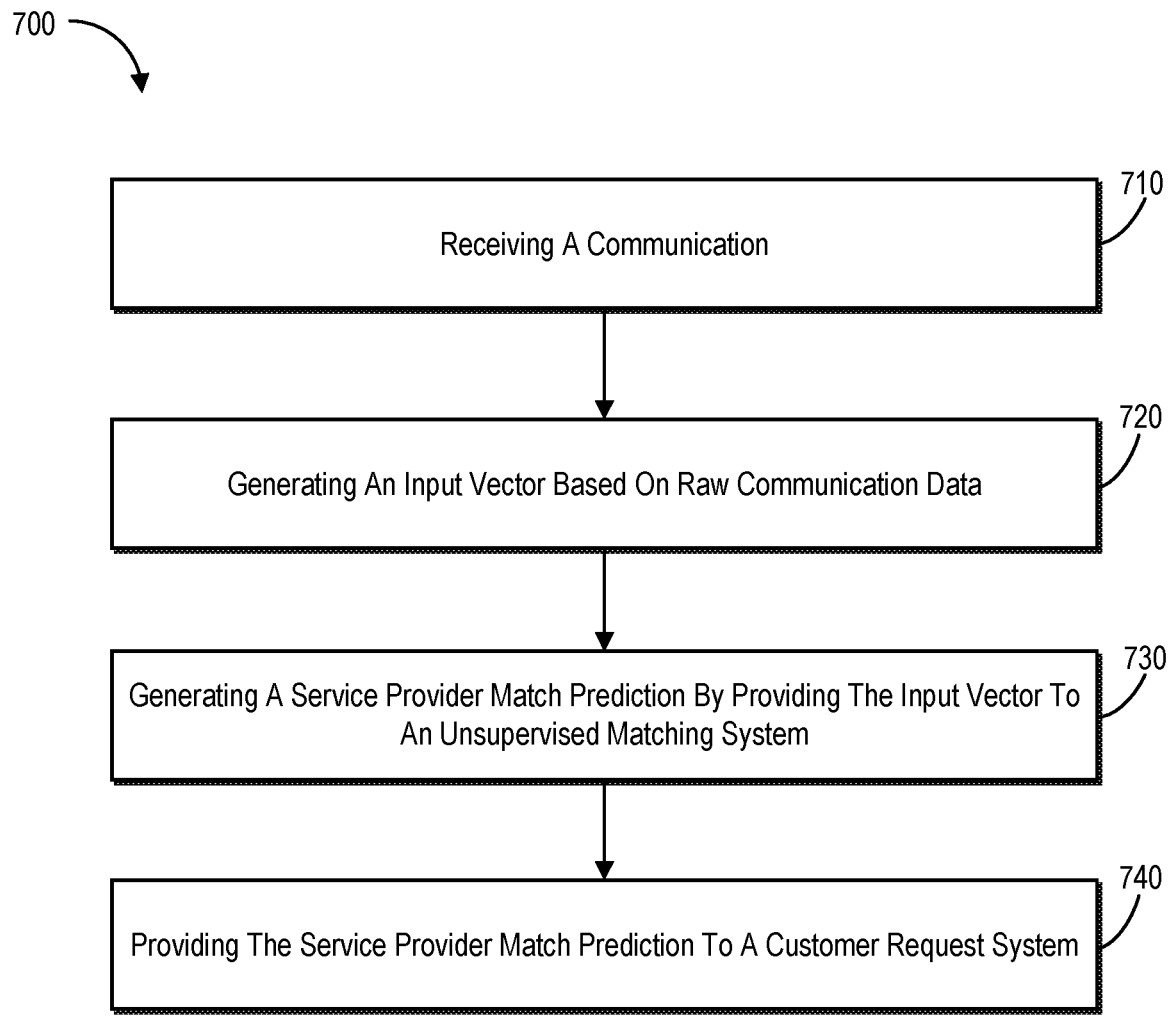
FIG. 7 illustrates a flowchart of a series of acts for generating a service provider match prediction in accordance with one or more embodiments.

FIGS. 1-6, the corresponding text, and the examples provide a number of different methods, systems, devices, and non-transitory computer-readable media of the unsupervised matching system 102. In addition to the foregoing, one or more embodiments can also be described in terms of flowcharts comprising acts for accomplishing a particular result, as shown in FIG. 7. FIG. 7 may be performed with more or fewer acts. Further, the acts may be performed in differing orders. Additionally, the acts described herein may be repeated or performed in parallel with one another or parallel with different instances of the same or similar acts.

As mentioned, FIG. 7 illustrates a flowchart of a series of acts 700 for generating a service provider match prediction in accordance with one or more embodiments utilizing an unsupervised matching system (e.g., a service provider match neural network). While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer-readable medium can comprise instructions that, when executed by one or more processors, cause a computing device to perform the acts of FIG. 7. In some embodiments, a system can perform the acts of FIG. 10.

As shown in FIG. 7, the series of acts 700 includes an act 710 of receiving a communication. For example, the act 710 can involve receiving a communication from a client device associated with a contacting user. For instance, receiving a communication from the client device can include receiving one or more of an audio communication, a video communication, or a text communication. In one or more embodiments, the services of acts 700 can further include, in response to receiving the communication from the client device, identifying a user ID associated with the contacting user.

Also as shown in FIG. 7, the series of acts 700 includes an act 720 of generating an input vector based on raw communication data. For example, the act 720 can involve generating an input vector based on raw communication data associated with the contacting user. In one or more embodiments, generating the input vector includes extracting the raw communication data from the received communication. For instance, generating the input vector further can include configuring the extracted raw communication data to match a standard input vector format associated with the unsupervised matching system. In at least one embodiment, generating the input vector includes: identifying, from a raw communication data repository and based on the user ID, the raw communication data associated with the contacting user, and configuring the identified raw communication data to match a standard input vector format associated with the unsupervised matching system.

The series of acts 700 also includes an act 730 of generating a service provider match prediction by providing the input vector to an unsupervised matching system. For example, the act 730 can involve generating a service provider match prediction by: providing the input vector to an unsupervised matching system, wherein the unsupervised matching system is trained to generate a service provider match from raw communication training data.

Additionally, the series of acts 700 includes an act 740 of providing the service provider match prediction to a customer request system. For example, the act 740 can involve, in response to generating the service provider match prediction, providing the service provider match prediction to a customer request system.

In one or more embodiments, the series of acts 700 further includes, prior to receiving the communication from the client device associated with the contacting user, training the unsupervised matching system to generate the service provider match. For example, training the unsupervised matching system can include: generating a plurality of training input vectors based on raw communication training data, wherein each training input vector is associated with a corresponding service provider match marker, and for each of the plurality of training input vectors: providing the training input vector to the unsupervised matching system to generate a service provider match prediction, and comparing the service provider match prediction with the corresponding service provider match marker to modify parameters of the unsupervised matching system.

In one or more embodiments, the series of acts 700 further includes: receiving, from the customer request system, an indication that the service provider match prediction cannot be accommodated, in response to receiving the indication, modifying one or more parameters of the unsupervised matching system, and generating a second service provider match prediction utilizing the unsupervised matching system.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
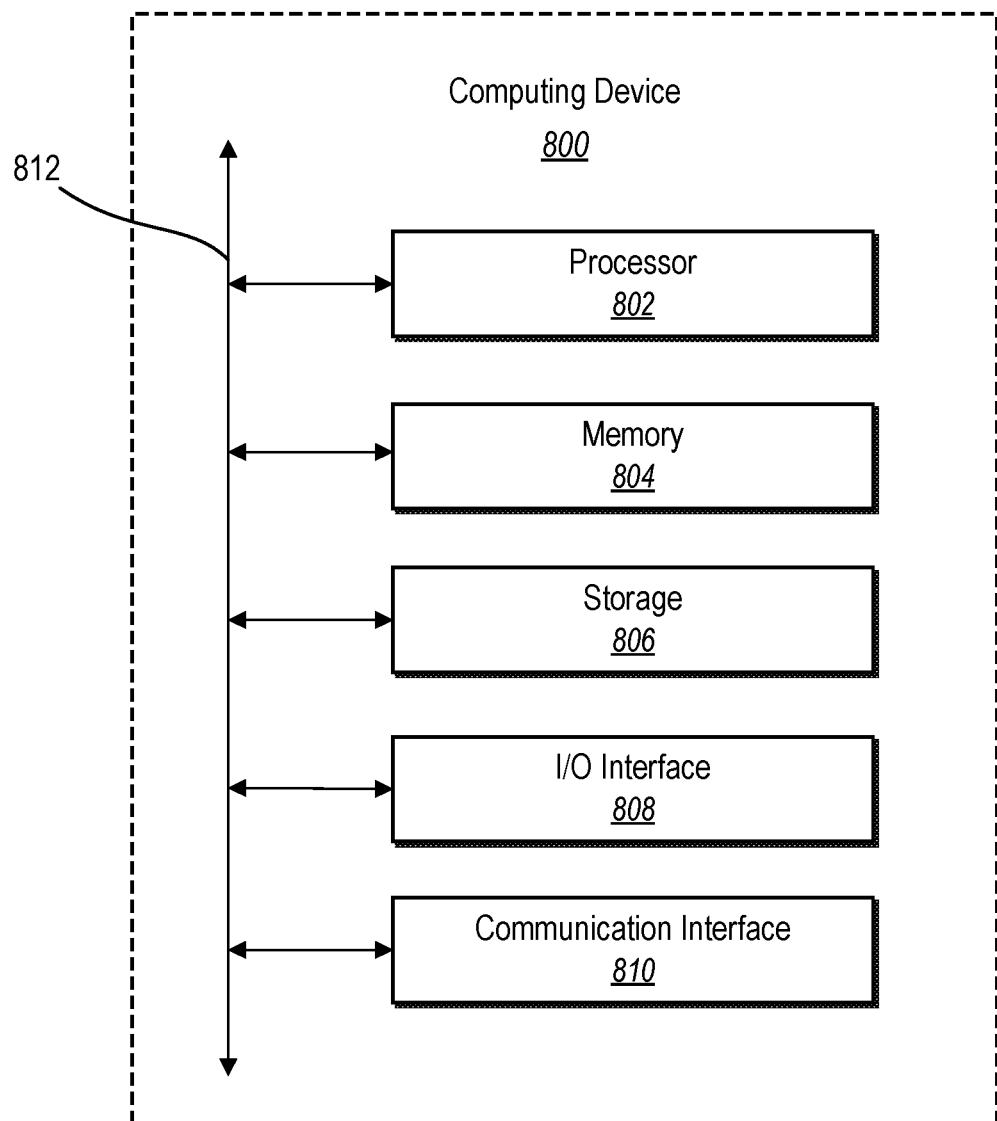
FIG. 8 illustrates an example computing device in accordance with one or more embodiments.

FIG. 8 illustrates, in block diagram form, an example computing device 800 (e.g., the computing device 800, a client device 108, a service provider device 112, and/or the server(s) 106) that may be configured to perform one or more of the processes described above. One will appreciate that the unsupervised matching system 102 can comprise implementations of the computing device 800. As shown by FIG. 8, the computing device can comprise a processor 802, memory 804, a storage device 806, an I/O interface 808, and a communication interface 810. Furthermore, the computing device 800 can include an input device such as a touchscreen, mouse, keyboard, etc. In certain embodiments, the computing device 800 can include fewer or more components than those shown in FIG. 8. Components of computing device 800 shown in FIG. 8 will now be described in additional detail.

In particular embodiments, processor(s) 802 includes hardware for executing instructions, such as those making up a computer program. As an example, and not by way of limitation, to execute instructions, processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, storage device 806 can comprise a non-transitory storage medium described above. The storage device 806 may include a hard disk drive (HDD), flash memory, a Universal Serial Bus (USB) drive or a combination of these or other storage devices.

The computing device 800 also includes one or more input or output ("I/O") devices/interfaces 808, which are provided to allow a user to provide input to (such as user strokes), receive output from, and otherwise transfer data to and from the computing device 800. These I/O devices/interfaces 808 may include a mouse, keypad or a keyboard, a touch screen, camera, optical scanner, network interface, modem, other known I/O devices or a combination of such I/O devices/interfaces 808. The touch screen may be activated with a writing device or a finger.

The I/O devices/interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 808 is configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 can provide one or more interfaces for communication (such as, for example, packet-based communication) between the computing device and one or more other computing devices 800 or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can comprise hardware, software, or both that couples components of computing device 800 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

Figure 9:
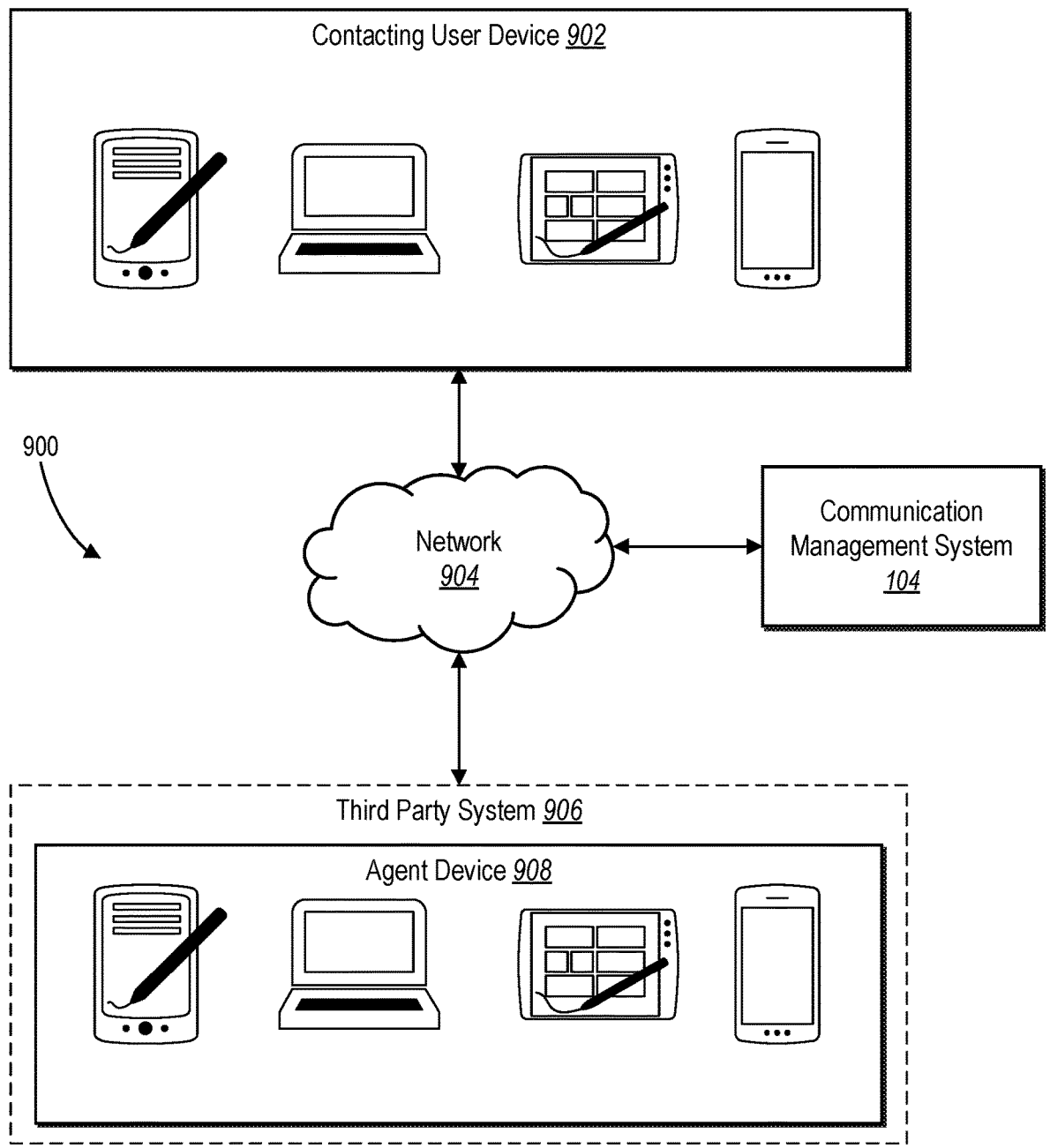
FIG. 9 illustrates an example communication system in accordance with one or more embodiments.

FIG. 9 illustrates an example network environment 900 of a communication management system (e.g., the communication management system 104). Network environment 900 includes a contacting user device 902 (e.g., a client device 108), a communication management system 104, a third party system 906 (e.g., the third-party server(s) 120), and an agent device 908 (e.g., a service provider device 112), connected to each other by a network 904 (e.g., the network 122 as shown in FIG. 1). Although FIG. 9 illustrates a particular arrangement of the contacting user device 902, the communication management system 104, the agent device 908, the third-party system 906, and network 904, this disclosure contemplates any suitable arrangement of the contacting user device 902, the communication management system 104, the third-party system 906, the agent device 908, and the network 904. As an example, and not by way of limitation, two or more of the contacting user device 902, the communication management system 104, the agent device 908, and the third-party system 906 may be connected to each other directly, bypassing network 904. As another example, two or more of the contacting user device 902, the communication management system 104, the agent device 908, and the third-party system 906 may be physically or logically co-located with each other in whole or in part. Moreover, although FIG. 9 illustrates a particular number of contacting user devices 902, communication management system 104, agent devices 908, third-party systems 906, and networks 904, this disclosure contemplates any suitable number of contacting user devices 902, communication management system 104, agent devices 908, third-party systems 906, and networks 904. As an example, and not by way of limitation, network environment 900 may include multiple contacting user devices 902, communication management system 104, agent devices 908, third-party systems 906, and networks 904.

This disclosure contemplates any suitable network 904. As an example, and not by way of limitation, one or more portions of the network 904 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 904 may include one or more networks 904.

Links may connect the contacting user device 902, the communication management system 104, the agent device 908, and the third-party system 906 to communication network 904 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links may differ in one or more respects from one or more second links.

In particular embodiments, the contacting user device 902 and/or agent device 908 may be an electronic device including hardware, software, or embedded logic components or a combination of two or more such components capable of carrying out the appropriate functionalities implemented or supported by the contacting user device 902 and/or agent device 908. As an example, and not by way of limitation, a contacting user device 902 or agent device 908 may include any of the computing devices discussed above in relation to FIG. 8. A contacting user device 902 may enable a network user (e.g., a contacting user) at the contacting user device 902 to access the network 904. A contacting user device 902 may enable its user to communicate with other users at other contacting user devices 902 and/or agent devices 908. Likewise, an agent device 908 may enable its user to communicate with contacting user devices 902, third-party systems 906, and/or the communication management system 104.

In particular embodiments, the agent device 908 is part of (e.g., housed within, either entirely or in part) the third-party system 906. For example, the third-party system 906 may include a service system which maintains one or more agent users, each associated with a separate agent device 908. Accordingly, the communication management system 104 provides various functionality, user interfaces, electronic communications, and other information to the agent device 908 via the third-party system 906. In other embodiments, the agent device 908 is not associated with or part of a third-party system 906. Rather, the agent device 908 refers to a client device associated directly with the communication management system 104 or a different third-party and that communicates with the communication management system 104 without interaction via the third-party system 906.

In particular embodiments, the contacting user device 902 and/or the agent device 908 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at contacting user device 902 and/or agent device 908 may enter a Uniform Resource Locator (URL) or other address directing the web browser to a particular server (such as server, or a server associated with a third-party system 906), and the web browser may generate a Hyper Text Transfer Protocol (HTTP) request and communicate the HTTP request to server. The server may accept the HTTP request and communicate to the contacting user device 902 (or the agent device 908) one or more Hyper Text Markup Language (HTML) files responsive to the HTTP request. The contacting user device 902 and/or agent device 908 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the communication management system 104 may be a network-addressable computing system that can host an online communication network. The communication management system 104 may generate, store, receive, and send messaging data, such as, for example, text data, audio data, and video data. The communication management system 104 can further generate, store, receive, and send other data such as user-profile data, location data, or other suitable data related to the online communication network. The communication management system 104 may be accessed by the other components of network environment 900 either directly or via network 904. In particular embodiments, the communication management system 104 may include one or more servers. Each server may be a unitary server or a distributed server spanning multiple computers or multiple datacenters. Servers may be of various types, such as, for example and without limitation, a web server, a communication server, a news server, a mail server, a message server, an advertising server, a file server, an application server, an exchange server, a database server, a proxy server, or another server suitable for performing functions or processes described herein, or any combination thereof. In particular embodiments, each server may include hardware, software, or embedded logic components or a combination of two or more such components for carrying out the appropriate functionalities implemented or supported by server.

In particular embodiments, the communication management system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a contacting user device 902, a communication management system 104, an agent device 908, or a third-party system 906 to manage, retrieve, modify, add, or delete, the information stored in data store.

In particular embodiments, the communication management system 104 may store one or more correspondences in one or more data stores. In particular embodiments, a correspondence may include electronic messages—which may include digital audio, digital video, and/or digital text (e.g., as received in an electronic message or as transcribed from digital audio). The communication management system 104 may provide users (e.g., contacting users) of the online communication network the ability to communicate and interact with other users (e.g., agent users). In particular embodiments, agent users may join the online communication network via the communication management system 104, and the communication management system 104 may maintain connects for the agent users, including current and historical information relating to contacting users with whom the agent users interact.

In particular embodiments, the communication management system 104 may provide agent users with the ability to take actions on various types of items or objects, supported by communication management system 104. As an example, and not by way of limitation, the items and objects may include groups or individual contacting users communicating with the communication management system 104, computer-based applications that a user may use, transactions that allow agent users to buy, return, or sell items or services, indications that allow agent users to report events, or other interactions with various operations that an agent user may perform to assist a contacting user.

In particular embodiments, the communication management system 104 may be capable of linking a variety of entities. As an example, and not by way of limitation, the communication management system 104 may enable users such as contacting users and agent users to interact with each other as well as receive content from third-party systems 906 or other entities, or to allow users to interact with these entities through an application programming interfaces (API) or other communication channels.

In particular embodiments, a third-party system 906 may include one or more types of servers, one or more data stores, one or more interfaces, including but not limited to APIs, one or more web services, one or more content sources, one or more networks, or any other suitable components, e.g., that servers may communicate with. A third-party system 906 may be operated by a different entity from an entity operating the communication management system 104. In particular embodiments, however, the communication management system 104 and third-party systems 906 may operate in conjunction with each other to provide communication services to users of the communication management system 104 or third-party systems 906. In this sense, the communication management system 104 may provide a platform, or backbone, which other systems, such as third-party systems 906, may use to provide communication services and functionality to users across the Internet or other network.

In particular embodiments, a third-party system 906 may include a third-party service system. A third-party content service system may include one or more sources of products or services that are used by contacting user. As an example, and not by way of limitation, a service system can include a traffic monitoring system, a social networking system, an emergency reporting system, a home repair system, a weather monitoring system, an internet service provider system, an airline system, a transportation provider system, a news media system, a travel accommodation system, an electronic smart appliance distribution or monitoring system, or a power distribution or monitoring system.

In particular embodiments, the communication management system 104 may include a variety of servers, subsystems, programs, modules, logs, and data stores. In particular embodiments, the communication management system 104 may include one or more of the following: a web server, action logger, API-request server, notification controller, action log, inference module, search module, advertisement-targeting module, user-interface module, user-profile store, third-party content store, or location store. The communication management system 104 may also include suitable components such as network interfaces, security mechanisms, load balancers, failover servers, management-and-network-operations consoles, other suitable components, or any suitable combination thereof. In particular embodiments, the communication management system 104 may include one or more user-profile stores for storing user profiles (e.g., for contacting users). A user profile may include, for example, contacting user information, biographic information, demographic information, behavioral information, social information, or other types of descriptive information, such as work experience, educational history, hobbies or preferences, interests, affinities, or location.

The web server may include a mail server or other messaging functionality for receiving and routing messages between the communication management system 104 and one or more contacting user devices 902 or agent devices 906. An API-request server may allow a third-party system 906 to access information from the communication management system 104 by calling one or more APIs. An action logger may be used to receive communications from a web server about a user's actions on or off the communication management system 104. Information may be pushed to a contacting user device 902 and/or agent device 908 as notifications, or information may be pulled from contacting user device 902 responsive to a request received from contacting user device 902 or agent device 908.

I claim:

1. A computer-implemented method to generate service provider matches comprising:
receiving a communication from a client device associated with a contacting user;
generating an input vector based on raw communication data associated with the contacting user;
generating a service provider match prediction by:
providing the input vector to an unsupervised matching system,
wherein the unsupervised matching system generates a service provider match from raw communication training data; and
in response to generating the service provider match prediction, providing the service provider match prediction to a customer request system.

2. The computer-implemented method as recited in claim 1, wherein generating the input vector comprises extracting the raw communication data from the received communication.

3. The computer-implemented method as recited in claim 2, wherein generating the input vector further comprises configuring the extracted raw communication data to match a standard input vector format associated with the unsupervised matching system.

4. The computer-implemented method as recited in claim 1, further comprising, in response to receiving the communication from the client device, identifying a user ID associated with the contacting user.

5. The computer-implemented method as recited in claim 4, wherein generating the input vector comprises:
identifying, from a raw communication data repository and based on the user ID, the raw communication data associated with the contacting user; and
configuring the identified raw communication data to match a standard input vector format associated with the unsupervised matching system.

6. The computer-implemented method as recited in claim 1, wherein receiving a communication from the client device comprises receiving one or more of an audio communication, a video communication, or a text communication.

7. The computer-implemented method as recited in claim 1, further comprising, prior to receiving the communication from the client device associated with the contacting user, training the unsupervised matching system to generate the service provider match by:
generating a plurality of training input vectors based on raw communication training data, wherein each training input vector is associated with a corresponding service provider match marker; and
for each of the plurality of training input vectors:
providing the training input vector to the unsupervised matching system to generate a service provider match prediction, and
comparing the service provider match prediction with the corresponding service provider match marker to modify parameters of the unsupervised matching system.

8. The computer-implemented method as recited in claim 1, further comprising:
receiving, from the customer request system, an indication that the service provider match prediction cannot be accommodated;
in response to receiving the indication, modifying one or more parameters of the unsupervised matching system; and
generating a second service provider match prediction utilizing the unsupervised matching system.

9. A system comprising:
at least one processor; and
at least one non-transitory computer-readable storage medium storing instructions thereon that, when executed by the at least one processor, cause the system to:
receive a communication from a client device associated with a contacting user;

generate an input vector based on raw communication data associated with the contacting user;
generate a service provider match prediction by:
providing the input vector to an unsupervised matching system,
wherein the unsupervised matching system generates a service provider match from raw communication training data; and
in response to generating the service provider match prediction, provide the service provider match prediction to a customer request system.

10. The system as recited in claim 9, wherein generating the input vector comprises extracting the raw communication data from the received communication.

11. The system as recited in 10, wherein generating the input vector further comprises configuring the extracted raw communication data to match a standard input vector format associated with the unsupervised matching system.

12. The system as recited in claim 9, further storing instructions thereon that, when executed by the at least one processor, cause the system to, in response to receiving the communication from the client device, identify a user ID associated with the contacting user.

13. The system as recited in claim 12, wherein generating the input vector comprises:
identifying, from a raw communication data repository and based on the user ID, the raw communication data associated with the contacting user; and
configuring the identified raw communication data to match a standard input vector format associated with the unsupervised matching system.

14. The system as recited in claim 9, wherein receiving a communication from the client device comprises receiving one or more of an audio communication, a video communication, or a text communication.

15. The system as recited in claim 9, further storing instructions thereon that, when executed by the at least one processor, cause the system to, prior to receiving the communication from the client device associated with the contacting user, train the unsupervised matching system to generate the service provider match by:
generating a plurality of training input vectors based on raw communication training data, wherein each training input vector is associated with a corresponding service provider match marker; and
for each of the plurality of training input vectors:
providing the training input vector to the unsupervised matching system to generate a service provider match prediction,
comparing the service provider match prediction with the corresponding service provider match marker to modify parameters of the unsupervised matching system.

16. The system as recited in claim 9, further storing instructions thereon that, when executed by the at least one processor, cause the system to:
receive, from the customer request system, an indication that the service provider match prediction cannot be accommodated;
in response to receiving the indication, modify one or more parameters of the unsupervised matching system; and
generate a second service provider match prediction utilizing the unsupervised matching system.

17. A non-transitory computer-readable medium storing instructions thereon that, when executed by at least one processor, cause a computer system to:
receive a communication from a client device associated with a contacting user;
generate an input vector based on raw communication data associated with the contacting user;
generate a service provider match prediction by:
providing the input vector to an unsupervised matching system,
wherein the unsupervised matching system generates a service provider match from raw communication training data; and
in response to generating the service provider match prediction, provide the service provider match prediction to a customer request system.

18. The non-transitory computer-readable medium as recited in claim 17, further storing instructions thereon that, when executed by the at least one processor, cause the computer system to:
in response to receiving the communication from the client device, identify a user ID associated with the contacting user; and
wherein generating the input vector comprises:
identifying, from a raw communication data repository and based on the user ID, the raw communication data associated with the contacting user; and
configuring the identified raw communication data to match a standard input vector format associated with the unsupervised matching system.

19. The non-transitory computer-readable medium as recited in claim 18, further storing instructions thereon that, when executed by the at least one processor, cause the computer system to, prior to receiving the communication from the client device associated with the contacting user, train the unsupervised matching system to generate the service provider match by:
generating a plurality of training input vectors based on raw communication training data, wherein each training input vector is associated with a corresponding service provider match marker; and
for each of the plurality of training input vectors:
providing the training input vector to the unsupervised matching system to generate a service provider match prediction,
comparing the service provider match prediction with the corresponding service provider match marker to modify parameters of the unsupervised matching system.

20. The non-transitory computer-readable medium as recited in claim 19, further storing instructions thereon that, when executed by the at least one processor, cause the computer system to:
receive, from the customer request system, an indication that the service provider match prediction cannot be accommodated;
in response to receiving the indication, modify one or more parameters of the unsupervised matching system; and
generate a second service provider match prediction utilizing the unsupervised matching system.

* * * * *